United States Patent
Carmel et al.

(10) Patent No.: US 10,134,121 B2
(45) Date of Patent: Nov. 20, 2018

(54) METHOD AND SYSTEM OF CONTROLLING A QUALITY MEASURE

(71) Applicant: BEAMR IMAGING LTD, Tel-Aviv (IL)

(72) Inventors: Sharon Carmel, Ramat Hasharon (IL); Dror Gill, Haifa (IL); Tamar Shoham, Netanya (IL); Udi Yehuda Shrot, Givat Shmuel (IL)

(73) Assignee: BEAMR IMAGING LTD, Tel Aviv (IL)

( * ) Notice: Subject to any disclaimer, the term of this patent is extended or adjusted under 35 U.S.C. 154(b) by 0 days.

(21) Appl. No.: 15/541,905

(22) PCT Filed: Feb. 16, 2016

(86) PCT No.: PCT/IL2016/050181
§ 371 (c)(1),
(2) Date: Jul. 6, 2017

(87) PCT Pub. No.: WO2016/142931
PCT Pub. Date: Sep. 15, 2016

(65) Prior Publication Data
US 2017/0372467 A1 Dec. 28, 2017

Related U.S. Application Data

(60) Provisional application No. 62/130,756, filed on Mar. 10, 2015.

(51) Int. Cl.
*G06T 7/90* (2017.01)
*G06T 7/00* (2017.01)
(Continued)

(52) U.S. Cl.
CPC ............ *G06T 7/0002* (2013.01); *G06K 9/036* (2013.01); *G06K 9/4604* (2013.01); *G06T 5/002* (2013.01);
(Continued)

(58) Field of Classification Search
CPC combination set(s) only.
See application file for complete search history.

(56) References Cited

U.S. PATENT DOCUMENTS 7,373,013 B2 * 5/2008 Anderson ............... G06T 5/002
358/3.26
7,599,572 B2 * 10/2009 Shekter .................... G06K 9/40
358/463
(Continued)

FOREIGN PATENT DOCUMENTS

JP 2006166130 A 6/2006
WO 2011/042898 4/2011
WO 2013/144942 10/2013

OTHER PUBLICATIONS

Khalsa, et al., Novel method for classification of Artificial and Natural images, International Journal of Scientific & Engineering Research, Mar. 2014, pp. 1000-1004, vol. 5, issue 3.
(Continued)

*Primary Examiner* — Anand Bhatnagar
(74) *Attorney, Agent, or Firm* — Browdy and Neimark, P.L.L.C.

(57) ABSTRACT

There is provided a computerized method and system of controlling a quality measure in a compression quality evaluation system, the method comprising: calculating a value indicative of a characteristic of an input image; and configuring the quality measure upon a criterion being met by the value, the quality measure being indicative of perceptual quality of a compressed image compressed from the input image. The value can be a smoothness value indicative
(Continued)

of an extent of smoothness of an input image, and the configuration of the quality measure can be performed upon a smoothness criterion being met by the smoothness value. Alternatively, the value can be a gradient value indicative of an extent of gradual spatial changes of an input image, and the configuration of the quality measure can be performed upon a gradient criterion being met by the gradient value.

41 Claims, 20 Drawing Sheets

(51) Int. Cl.
  *G06T 5/00* (2006.01)
  *G06T 7/40* (2017.01)
  *G06K 9/03* (2006.01)
  *G06K 9/46* (2006.01)
(52) U.S. Cl.
  CPC .............. *G06T 7/40* (2013.01); *G06T 7/90* (2017.01); *G06T 2207/10016* (2013.01); *G06T 2207/10024* (2013.01); *G06T 2207/20012* (2013.01); *G06T 2207/20021* (2013.01); *G06T 2207/30168* (2013.01)

(56) References Cited

U.S. PATENT DOCUMENTS

| | | | | |
|---|---|---|---|---|
| 7,657,114 | B2* | 2/2010 | Moon | G06T 5/002 358/3.26 |
| 7,706,624 | B2* | 4/2010 | Beazley | G06T 5/002 348/607 |
| 8,467,626 | B2* | 6/2013 | Bhagavathy | G06T 5/50 382/260 |
| 8,818,109 | B2* | 8/2014 | Kisilev | G06K 9/40 382/132 |
| 8,908,984 | B2 | 12/2014 | Carmel et al. | |
| 2002/0034337 | A1* | 3/2002 | Shekter | G06K 9/40 382/275 |
| 2005/0100235 | A1* | 5/2005 | Kong | H04N 19/176 382/261 |
| 2005/0135699 | A1* | 6/2005 | Anderson | G06T 5/002 382/261 |
| 2006/0171473 | A1* | 8/2006 | Schoner | G06T 5/002 375/240.27 |
| 2006/0233442 | A1* | 10/2006 | Lu | G06K 9/00711 382/190 |
| 2014/0211859 | A1 | 7/2014 | Carmel et al. | |
| 2014/0301649 | A1* | 10/2014 | Zhang | G06T 7/0002 382/199 |
| 2014/0354826 | A1 | 12/2014 | Kolarov et al. | |

OTHER PUBLICATIONS

Prabhakar, et al., Picture-graphics color image classification, Conference Paper in Proceedings/ICIP . . . International Conference on Image Processing, Jan. 2002, pp. 1-5.

* cited by examiner

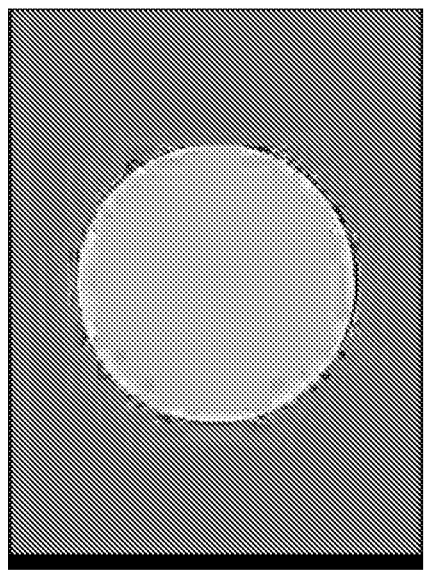
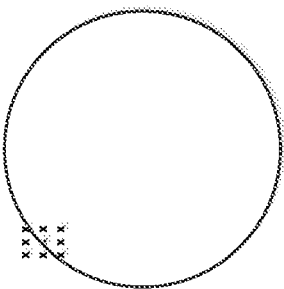
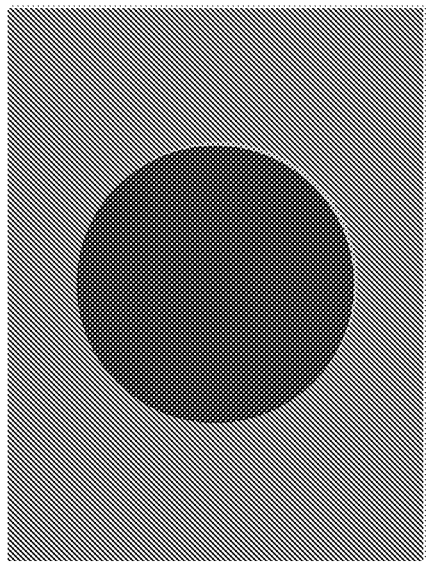
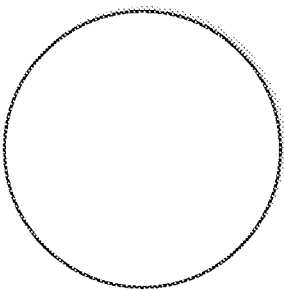
FIG. 7A
Fig. 7B

METHOD AND SYSTEM OF CONTROLLING A QUALITY MEASURE

TECHNICAL FIELD

The presently disclosed subject matter relates, in general, to the field of configuration of a quality measure in a compression quality evaluation system.

BACKGROUND

With the fast development of imaging and video technologies, images and video play a key role as a mechanism of information exchange, transmission or storage nowadays. Image or video compression systems, as well as compression quality evaluation systems have been widely deployed in many aspects. Due to the wide variety of content types of the input images, it is quite challenging for the compression quality evaluation system to reliably evaluate the compression quality. Sometimes it can be beneficial to use certain features of an input image or frame to configure or control such system.

Various techniques have been developed in this aspect and references considered to be relevant as background to the presently disclosed subject matter are listed below. Acknowledgement of the references herein is not to be inferred as meaning that these are in any way relevant to the patentability of the presently disclosed subject matter.

"Picture-graphics color image classification", S. Prabhakar, H. Cheng, J. C. Handley, Z. Fan, and Y. Lin, in Proc. ICIP (2), 2002, pp. 785-788 discloses that high-level (semantic) image classification can be achieved by analysis of low-level image attributes geared for the particular classes. There is proposed a novel application of the known image processing and classification techniques to achieve a high-level classification of color images. The image classification algorithm uses three low-level image features: texture, color, and edge characteristics to classify a color image into two classes: business graphics or natural picture.

"Novel method for classification of Artificial and Natural images", Nikkoo Khalsa. Dr. Vijay T. Ingole, International Journal of Scientific & Engineering Research, Volume 5, Issue 3, March-2014 discloses that the classification of images based on semantic description is a demanding and imperative problem in image retrieval system. Solitary easy features are extracted from the raw images data in order to exploit the dissimilarity of color pattern and spatial co-relation of pixels in Artificial and Natural images. These features have poor precision if used alone but when considered collectively, it forms a more complex and accurate global classifier with enhanced precision. There is described a method for classification of Artificial and Natural images with greater precision and low error rate.

GENERAL DESCRIPTION

In accordance with certain aspects of the presently disclosed subject matter, there is provided a computerized method of controlling a quality measure in a compression quality evaluation system, the method comprising: calculating a smoothness value indicative of an extent of smoothness of an input image; and configuring the quality measure upon a smoothness criterion being met by the smoothness value, the quality measure being indicative of perceptual quality of a compressed image compressed from the input image.

In accordance with other aspects of the presently disclosed subject matter, there is provided a computerized system of controlling a quality measure in a compression quality evaluation system, the system comprising a processor configured to: calculate a smoothness value indicative of an extent of smoothness of an input image; and configure the quality measure upon a smoothness criterion being met by the smoothness value, the quality measure being indicative of perceptual quality of a compressed image compressed from the input image.

In accordance with other aspects of the presently disclosed subject matter, there is provided a non-transitory computer readable storage medium tangibly embodying a program of instructions executable by a machine to control a quality measure in a compression quality evaluation system, comprising the steps of the following: calculating a smoothness value indicative of an extent of smoothness of an input image; and configuring the quality measure upon a smoothness criterion being met by the smoothness value, the quality measure being indicative of perceptual quality of a compressed image compressed from the input image.

In accordance with further aspects of the presently disclosed subject matter, and optionally, in combination with any of the above aspects, the calculating of the smoothness value can be based on at least a portion of the input image. In some cases, the at least a portion can comprise a plurality of variance blocks, and the calculating can include: computing a plurality of variance values each for a respective variance block, each variance value representing a statistical variance of pixel values in the respective variance block; and calculating the smoothness value for the input image based on the plurality of variance values. In some other cases, the at least a portion can comprise a plurality of superblocks each including one or more variance blocks, and the calculating can include: i) computing one or more variance values each for a respective variance block in a superblock, each variance value representing a statistical variance of pixel values in the respective variance block; ii) computing a local smoothness value for the superblock based on the one or more variance values; iii) repeating the steps i) and ii) for each superblock, giving rise to a plurality of local smoothness values each for a respective superblock, and iv) pooling the plurality of local smoothness values to obtain the smoothness value for the input image. In yet further cases, the at least a portion can comprise one or more tiles, and the method can comprise: calculating one or more tile smoothness values each for a tile, each tile smoothness value indicative of an extent of smoothness of the tile; and configuring the quality measure upon the smoothness criterion being met by at least one tile smoothness value of at least one tile.

In accordance with further aspects of the presently disclosed subject matter, and optionally, in combination with any of the above aspects, an area of the at least a portion of input image can be excluded from the calculation of the smoothness value upon a condition being met. The condition can be that no pixel value of the area exceeds a darkness threshold. The pooling can be based on at least one of the following: an average value of the plurality of local smoothness values, a maximal local smoothness value, and a minimal local smoothness value. The configuring can comprise configuring a local similarity measure that quantifies local similarities between the input image and the compressed image. The configuring a local similarity measure can include: detecting edges in the at least a portion of the input image; and computing a local similarity score in accordance with the local similarity measure for a group of pixels in proximity of and on the edges.

In accordance with other aspects of the presently disclosed subject matter, there is provided a computerized method of controlling a quality measure in a compression quality evaluation system, the method comprising: calculating a gradient value indicative of an extent of gradual spatial changes of an input image; and configuring the quality measure upon a gradient criterion being met by the gradient value, the quality measure being indicative of perceptual quality of a compressed image compressed from the input image.

In accordance with other aspects of the presently disclosed subject matter, there is provided a computerized system of controlling a quality measure in a compression quality evaluation system, the system comprising a processor configured to: calculate a gradient value indicative of an extent of gradual spatial changes of an input image; and configure the quality measure upon a gradient criterion being met by the gradient value, the quality measure being indicative of perceptual quality of a compressed image compressed from the input image.

In accordance with other aspects of the presently disclosed subject matter, there is provided a non-transitory computer readable storage medium tangibly embodying a program of instructions executable by a machine to control a quality measure in a compression quality evaluation system, comprising the steps of the following: calculating a gradient value indicative of an extent of gradual spatial changes of an input image; and configuring the quality measure upon a gradient criterion being met by the gradient value, the quality measure being indicative of perceptual quality of a compressed image compressed from the input image.

In accordance with further aspects of the presently disclosed subject matter, and optionally, in combination with any of the appropriate above aspects, the calculating can be based on at least a portion of the input image. In some cases, the at least a portion can comprise a plurality of coding blocks, and the calculating of the gradient value can include: i) calculating a block range value for each coding block indicating a range of pixel values in the coding block; ii) computing a plurality of local gradient values each for a coding block upon a plurality of conditions being met; and iii) computing the gradient value for the at least a portion of the input image based on the plurality of local gradient values. The plurality of conditions can include: a) the block range value of the coding block is below a first threshold; b) the block range value of at least one adjacent coding block of the coding block is below the first threshold; and c) at least one block pair range value indicating a range of pixel values in a block pair meets a range criterion, the block pair including the coding block and one of the at least one adjacent coding block of which the block range value is below the first threshold. The local gradient score can be computed based on the block range value of the coding block and the at least one block pair range value. The range criterion can be that the block pair range value is larger than the block range value and smaller than a second threshold. The gradient value can be computed based on at least one of the following: an average of the plurality of local gradient values, a maximal local gradient value, and a minimal local gradient value.

In accordance with further aspects of the presently disclosed subject matter, and optionally, in combination with any of the appropriate above aspects, at least a portion can comprise one or more tiles, and the method can comprise: calculating one or more tile gradient values each for a tile, each tile gradient value indicative of an extent of gradual spatial changes of the tile; and configuring the quality measure upon a gradient criterion being met by at least one tile gradient value of at least one tile. The one or more tiles each can comprise a plurality of coding blocks, and the calculation of a plurality of tile gradient values can include: i) calculating a block range value for each coding block in a tile, the block range value indicating a range of pixel values in the coding block; ii) computing a plurality of local gradient values each for a coding block in the tile upon a plurality of conditions being met; iii) computing a tile gradient value for the tile based on the plurality of local gradient values; and iv) repeating the steps i)-iii) for each tile included in the at least a portion, giving rise to the one or more tile gradient values.

In accordance with further aspects of the presently disclosed subject matter, and optionally, in combination with any of the appropriate above aspects, the configuring can include: for each of the at least one tile, partitioning a tile pair including the tile and a corresponding compressed tile in the compressed image to a plurality of sub-tile pairs, each sub-tile pair including a sub-tile and a corresponding compressed sub-tile; calculating a sub-tile quality score for each sub-tile pair in accordance with the quality measure, giving rise to a plurality of sub-tile quality scores for the tile; and pooling the sub-tile quality scores to form a tile quality score. The quality measure to adapt a sub-tile tooling can be a local similarity measure quantifying local similarities between the input image and the compressed image. The configuring can further include adjusting a quality criterion of the quality measure based on the at least one tile gradient value or based on the gradient value. The quality measure can include a quality measure of added artifactual edges, and the configuring can include adjusting a quality criterion of the quality measure of added artifactual edges based on the at least one tile gradient value or based on the gradient value.

In accordance with other aspects of the presently disclosed subject matter, there is provided a computerized method of controlling a quality measure in a compression quality evaluation system based on an input image pair including an input image and a corresponding compressed image compressed from the input image, the method comprising: calculating a difference value indicative of an extent of difference between the compressed image and the input image; and configuring the quality measure upon a chroma artifact criterion being met by the difference value, the quality measure being indicative of perceptual quality of the compressed image.

In accordance with other aspects of the presently disclosed subject matter, there is provided a computerized system of controlling a quality measure in a compression quality evaluation system based on an input image pair including an input image and a corresponding compressed image compressed from the input image, the system comprising a processor configured to: calculate a difference value indicative of an extent of difference between the compressed image and the input image, and configure the quality measure upon a chroma artifact criterion being met by the difference value, the quality measure being indicative of perceptual quality of the compressed image.

In accordance with other aspects of the presently disclosed subject matter, there is provided a non-transitory computer readable storage medium tangibly embodying a program of instructions executable by a machine to control a quality measure in a compression quality evaluation system based on an input image pair including an input image and a corresponding compressed image compressed from the input image, comprising the steps of the following: calculating a difference value indicative of an extent of difference between the compressed image and the input image; and configuring the quality measure upon a chroma artifact criterion being met by the difference value, the quality measure being indicative of perceptual quality of the compressed image.

In accordance with further aspects of the presently disclosed subject matter, and optionally, in combination with any of the appropriate above aspects, the input image and the compressed image each can comprise luma information represented in a luma plane and chroma information represented in one or more chroma planes, and the method can further comprise: partitioning the input image pair into a plurality of tile groups according to a tile grid, each tile group comprising a luma tile pair in the luma plane, and one or more chroma tile pairs each in a chroma plane; and for each tile group, calculating a difference value for each tile pair in the tile group, giving rise to a luma tile difference value, and one or more chroma tile difference values, and determining the chroma artifact criterion being met by the tile group based on a first relationship among the luma tile difference value and the one or more chroma tile difference values of the tile group. The first relationship can be that at least one of the one or more chroma tile difference values is larger than the luma tile difference value, and the luma tile difference value exceeds a first threshold.

In accordance with further aspects of the presently disclosed subject matter, and optionally, in combination with any of the appropriate above aspects, the method can further comprise partitioning each tile group into a plurality of sub-tile groups according to a sub-tile grid, each sub-tile group comprising a luma sub-tile pair in the luma plane, and one or more chroma sub-tile pairs each in a chroma plane; for each sub-tile group in a tile group, calculating a difference value for each sub-tile pair in the sub-tile group, giving rise to a plurality of luma sub-tile difference values, and a plurality of chroma sub-tile difference values; and determining the chroma artifact criterion being met by the tile group based on a second relationship among the plurality of luma and chroma sub-tile difference values of the tile group. The second relationship can be that a maximal value of the chroma sub-tile difference values of the tile group is larger than a maximal luma sub-tile difference value, and the maximal luma sub-tile difference value exceeds a second threshold. The difference value can be calculated based on the difference between pixel values of the input image and pixel values of the compressed image. The difference value can be a Mean Square Error (MSE) value.

In accordance with further aspects of the presently disclosed subject matter, and optionally, in combination with any of the appropriate above aspects, the configuring can comprise computing a quality score in accordance with the quality measure based on chroma pixel values. The chroma pixel values are from a chroma plane that has the maximal value of the chroma sub-tile difference values. The configuring can comprise partitioning each tile group into a plurality of sub-tile groups according to a finer sub-tile grid than the sub-tile grid. The configuring can further comprise adapting perceptual weighting of sub-tile quality scores. The configuring can further include adjusting a quality criterion of the quality measure. The quality measure can include a quality measure of added artifactual edges, and the configuring can include adjusting a quality criterion of the quality measure of added artifactual edges. The configuring can comprise adapting perceptual weighting of tile quality scores. The adapting can comprise increasing the perceptual weighting for a tile group of which the chroma artifact criterion is met.

In accordance with further aspects of the presently disclosed subject matter, and optionally, in combination with any of the appropriate above aspects, the method further comprising: prior to the calculating, computing a synthetic value indicative of an extent of photo-realism of the input image, and determining to invoke the calculation of the difference value upon a synthetic criterion being met by the synthetic value. The synthetic value can be computed based on a distribution of pixel luminance values within the input image. In some cases, the method can further comprise: prior to the calculating, computing a smoothness value indicative of an extent of smoothness of the input image, and determining to invoke the calculation of the difference value upon a smoothness criterion being met by the smoothness value. In some other cases, the method can further comprise: prior to the calculating, computing a synthetic value indicative of an extent of photo-realism of the input image, computing a smoothness value indicative of an extent of smoothness of the input image, and determining to invoke the calculation of the difference value upon a combined criterion being met by the synthetic value and the smoothness value. In some further cases, the input image can comprise a plurality of tiles, and the computation of a smoothness value can comprise: computing an image smoothness value indicative of an extent of smoothness of the input image, and computing a plurality of tile smoothness values each for a tile indicative of an extent of smoothness of the tile, and the determining can comprise determining to invoke the calculation of the difference value upon a combined criterion being met by the synthetic value, the image smoothness value and the tile smoothness value.

BRIEF DESCRIPTION OF THE DRAWINGS

In order to understand the presently disclosed subject matter and to see how it may be carried out in practice, the subject matter will now be described, by way of non-limiting example only, with reference to the accompanying drawings, in which:

FIG. 7A is an exemplified illustration of an original image which contains smooth areas and a corresponding compressed image which has introduced compression artifacts in accordance with certain embodiments of the presently disclosed subject matter;

FIG. 7B is an exemplified illustration of a 3 pixel×3 pixel region around each edge pixel that are identified in the edge map for which the computation of the local similarity score is performed in accordance with certain embodiments of the presently disclosed subject matter;

DETAILED DESCRIPTION

Figure 1:
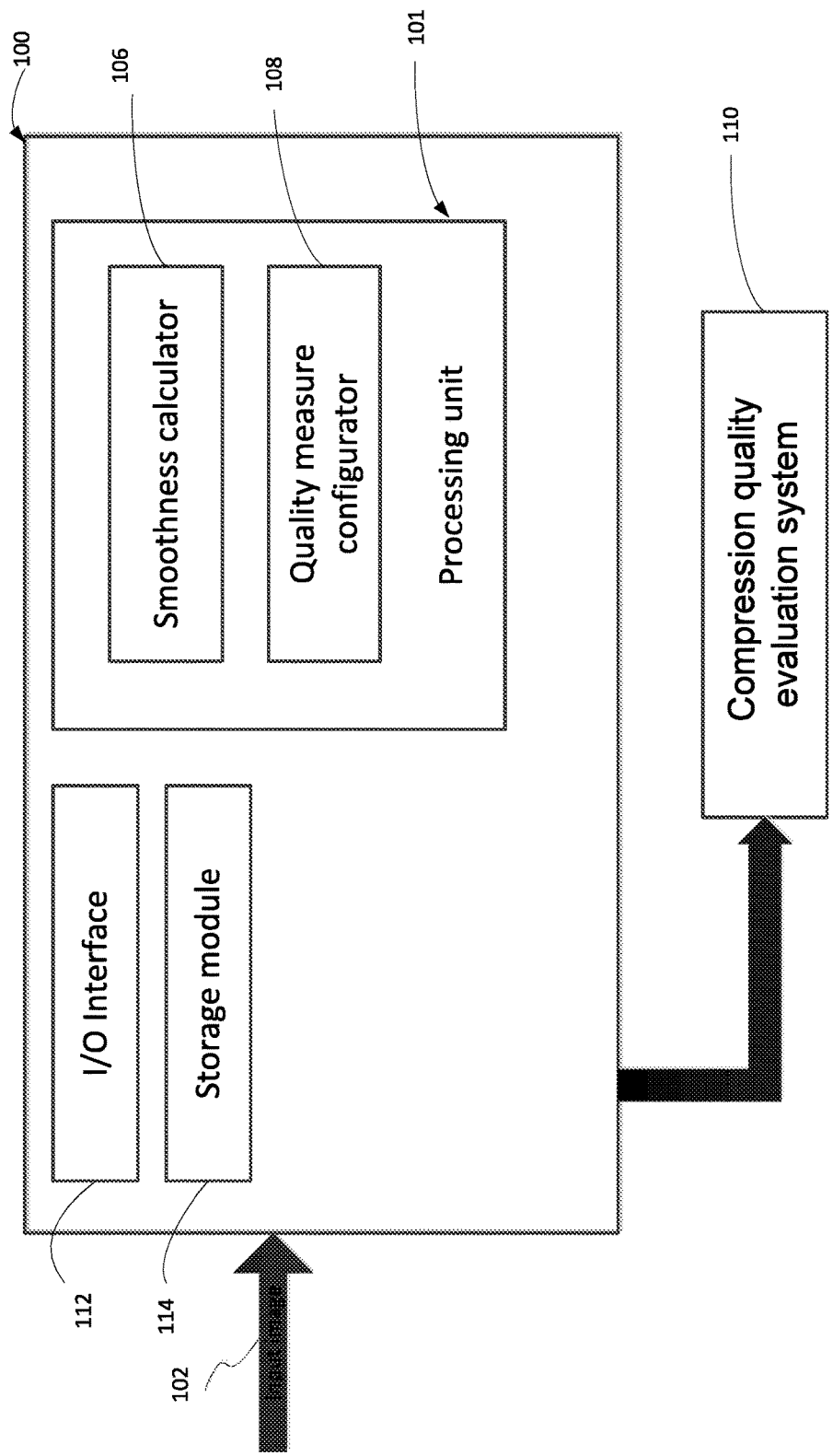
FIG. 1 is a functional block diagram schematically illustrating a first system for controlling a quality measure in a compression quality evaluation system in accordance with certain embodiments of the presently disclosed subject matter.

In the following detailed description, numerous specific details are set forth in order to provide a thorough understanding of the disclosed subject matter. However, it will be understood by those skilled in the art that the present disclosed subject matter can be practiced without these specific details. In other instances, well-known methods, procedures, and components have not been described in detail so as not to obscure the present disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "controlling", "calculating", "configuring", "excluding", "detecting", "adjusting", "adapting", "determining", "repeating", "pooling", "partitioning", or the like, include action and/or processes of a computer that manipulate and/or transform data into other data, said data represented as physical quantities, e.g. such as electronic quantities, and/or said data representing the physical objects. The terms "computer", "processor", and "processing unit" should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof. The terms "computer", "processor", and "processing unit" can include a single computer/processor/processing unit or a plurality of distributed or remote such units.

The operations in accordance with the teachings herein can be performed by a computer specially constructed for the desired purposes or by a general purpose computer specially configured for the desired purpose by a computer program stored in a non-transitory computer readable storage medium.

The term "non-transitory" is used herein to exclude transitory, propagating signals, but to otherwise include any volatile or non-volatile computer memory technology suitable to the presently disclosed subject matter.

As used herein, the phrase "for example," "such as", "for instance" and variants thereof describe non-limiting embodiments of the presently disclosed subject matter. Reference in the specification to "one case". "some cases". "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable subcombination.

In embodiments of the presently disclosed subject matter one or more stages illustrated in the figures may be executed in a different order and/or one or more groups of stages may be executed simultaneously and vice versa.

Bearing this in mind, attention is now drawn to FIG. 1, schematically illustrating a functional block diagram of a system for controlling a quality measure in a compression quality evaluation system in accordance with certain embodiments of the presently disclosed subject matter.

According to certain embodiments, there is provided a system 100 for controlling a quality measure in a compression quality evaluation system based on a smoothness measure of an input image 102. The system 100 can comprise a processing unit 101 that includes a smoothness calculator 106 and a quality measure configurator 108. The system 100 can be operatively connected to a compression quality evaluation system 110 for controlling the quality measure used therein, as will be described in details below.

According to certain embodiments, the compression quality evaluation system 110 can be configured to evaluate the compression quality of a compressed image as in an image content system (e.g., an image compression system). Alternatively or additionally, it can also evaluate the compression quality of a compressed video sequence, as in a video content system (e.g., a video compression system).

Various quality measures which aim to numerically quantify the perceptual quality of a compressed digital image (or a compressed frame in a compressed video sequence) as compared to an input original image (or original frame in an original video sequence) can be used in the compression quality evaluation system 110. For example, a possible usage of such a quality measure may be to control an image or video recompression system, aiming at introducing a controlled amount of degradation in the recompression process, for example allowing for perceptually lossless recompression.

The compression quality evaluation system 110 may implement any known quality measure. The term "quality measure" or "quality metric" is used herein to relate to a computable quality measure which provides an indication of video content quality. Such a quality measure receives as input a target image or video frame or a sequence of target video frames (e.g., candidate recompressed frames), and optionally also receives as input a corresponding reference image or video frame or a corresponding sequence of reference video frames (e.g., the input frames decoded from the input video bitstream), and uses various quality metrics or quality measures to calculate a quality score for the target frame or target frame sequence.

One example of a quality metric used herein can be a perceptual quality measure. By way of example, a perceptual quality measure can define a target (e.g., a minimal or a maximal) level of perceptual similarity. In other words, in such an example, the quality criterion can set forth a certain level of perceptual similarity, and the recompression operation can be configured to provide a candidate recompressed frame whose visual appearance, relative to the input video frame, is above (or below) the target level of perceptual similarity. In one example the quality criterion can include a requirement that a candidate recompressed frame is perceptually identical (i.e., the quality measure score is above a certain value) to the corresponding input video frame.

Examples of quality measures that can be utilized herein includes any of the following: Peak Signal to Noise Ratio (PSNR), Structural SIMilarity index (SSIM), Multi-Scale Structural SIMilarity index (MS-SSIM), Video Quality Metric (VQM), Visual information Fidelity (VIF), MOtion-based Video Integrity Evaluation (MOVIE), Perceptual Video Quality Measure (PVQM), quality measure using one or more of Added Artifactual Edges, texture distortion measure, and a combined quality measure combining inter-frame and intra-frame quality measures, such as described in US patent application publication No. 2014/0211859 published on Jul. 31, 2014, which is incorporated herein in its entirety by reference, in particular, see paragraphs [0132]-[0149] for an example of a pixel-wise intra-frame quality measure and paragraphs [0151]-[0178] for an example of an inter-frame quality measure, as well as paragraphs [0179]-[0242].

According to certain embodiments, the combined quality measure evaluates, for a given input frame, a respective compressed video frame (in some other cases it can be a recompressed video frame) whether the frame overall quality, measured as a combination of the compressed frame's inter-frame and intra-frame relative perceptual quality, meets a desired quality criterion or not. The combined quality measure can be implemented by computing an intra-frame quality score using an intra-frame quality measure that is applied in the pixel-domain of a current input frame and a corresponding current candidate compressed frame. An inter-frame quality score can also be computed by firstly computing a first difference value from the current input frame and a preceding input frame, and a second difference value from a candidate compressed frame and a preceding compressed frame. The inter-frame quality score for the current candidate compressed frame can then be determined based on a comparison between the first and second difference values.

According to certain embodiments, the intra-frame quality score can optionally be associated with one or more of the following intra-wise quality measures: an added artifactual edges measure, a texture distortion measure, a pixel-wise difference measure and an edge loss measure. By way of example, as part of the intra-frame quality score computation, an added artifactual edges measure can be implemented and an added artifactual edges score can be calculated. The added artifactual edges score can be calculated based on quantifying an extent of added artifactual edges along a video encoding coding block boundary of an encoded frame relative to an input video frame. In some cases, the extent of added artifactual edges can be determined according to a behavior of pixel values (e.g., a change of pixel values) across video coding block boundaries in relation to a behavior of pixel values on either side of respective video coding block boundaries.

By way of another example, as part of the intra-frame quality score computation, a texture distortion measure can be implemented and a texture distortion score can be calculated. The texture distortion measure can be based on relations between texture values in an encoded frame and in a corresponding input video frame. Each texture value corresponds to a variance of pixel values within each one of a plurality of predefined pixel groups in the encoded frame and in each respective pixel group in the corresponding input video frame.

By way of further example, as part of the intra-frame quality score computation, a pixel-wise difference measure can be implemented using a pixel-domain quality measure based on a pixel-wise difference between the video frame and the encoded frame.

By way of yet further example, as part of the intra-frame quality score computation, an edge loss measure can be implemented and an edge loss score can be calculated. For example, the edge loss score computation can include: obtaining an edge map corresponding to a video frame, computing for each edge pixel in the video frame an edge strength score based on a deviation between a value of an edge pixel and one or more pixels in the proximity of the edge pixel, computing for each corresponding pixel in the encoded frame an edge strength score based on a deviation between a value of the corresponding pixel and one or more pixels in the proximity of the corresponding pixel, and the edge loss score is calculated based on a relation among the edge strength score of the edge pixel and the edge strength score of the corresponding pixel.

According to certain embodiments, as part of the inter-frame quality score computation, the first difference value can be calculated based on a pixel-wise difference between an input video frame and a preceding input frame, and the second difference value can be calculated based on a pixel-wise difference between a current encoded frame and a preceding encoded frame encoded from the preceding input frame. Then the inter-frame quality score can be computed based on a comparison of the first difference value and the second difference value, in order to evaluate a temporal consistency of the encoded frame.

Based on the computed intra-frame quality score and inter-frame quality score, an overall quality score for the current candidate compressed frame can be computed. According to some embodiments, such combined quality measure can enable the video encoder to provide a near maximal compression rate for a given input frame while maintaining the overall relative perceptual quality of the respective compressed video frame at a level that meets a desired quality criterion.

Due to the wide variety of content types of the input digital images, it is quite challenging for the compression quality evaluation system to reliably evaluate and quantify their perceptual quality. Since the Human Visual System is highly sensitive to even the slightest quality degradation in certain areas of the images such as smooth regions, there is a need to improve performance of the quality measures especially for images containing those areas. Furthermore, using block-based coding/encoding schemes (also termed as block level coding/encoding scheme, or block transform coding/encoding scheme) such as, for example, MPEG-1, MPEG-2, H.261, H.263. MPEG-4 Part2, MPEG-4 part10, AVC. H.264. HEVC, Motion-JPEG, VP8, VP9, VC-1, WebM and ProRes, in an image or video compression process may introduce blockiness, ringing and/or banding artifacts in smooth areas, as exemplified in FIG. 7A. In some cases the block-based encoding scheme can be an encoding scheme utilizing a Discrete Cosine Transform (DCT).

Turning now to FIG. 7A, there is shown an exemplified illustration of an original image which contains smooth areas and a corresponding compressed image which has introduced compression artifacts in accordance with certain embodiments of the presently disclosed subject matter. As shown on the left in FIG. 7A, there is an original image which comprises a dark circle on a gray background. The circle and the background are both very smooth areas except for the edge of the circle which appears as a sharp transition between the two areas. On the right, there is the corresponding compressed image in which visible blockiness artifacts are introduced at block boundaries as well as ringing artifacts appeared as bands near the sharp transitions, e.g., around the edge of the circle. It is to be noted that that smooth areas may be present in both photo-realistic and computer generated images (i.e. synthetic images), although they are more prevalent in the synthetic images.

Accordingly system 100 is provided to evaluate and quantify the presence of smooth areas in the input image and to configure the quality measure upon the presence of such areas, for improved compression or recompression control.

As illustrated in FIG. 1, the system 100 may receive an input image 102 which can be, in some cases, a stand-alone picture or image, or part thereof, as in an image content system. In some other cases, the input image can be at least one frame or one slice of a video sequence as in a video content system. Without limiting the scope of the disclosure in any way, it should be noted that from here onwards the terms "picture", "image" and "frame" are used interchangeably to refer to any one of the following: a picture, an image, a frame of a video sequence or a slice thereof, and a field of an interlaced video frame etc. It is to be noted that the input image 102 can be an original unprocessed image, or in some other cases, it can be a degraded image (e.g., a compressed image) which is encoded from an original image.

According to certain embodiments, the smoothness calculator 106 can be configured to calculate a smoothness value indicative of an extent of smoothness of the input image 102. In some embodiments the smoothness value of the input image can be calculated based on at least a portion of the input image indicating the smoothness of that portion of the image. The quality measure configurator 108 can configure a quality measure upon a smoothness criterion being met by the smoothness value, as will be described in further details below with reference to FIG. 4A and FIG. 4D. Alternatively, the quality measure configurator 108 can provide a configuration instruction for the compression quality evaluation system 110 to configure the quality measure used therein. As aforementioned, the quality measure is used in the compression quality evaluation system 110 as an indication of perceptual quality of a compressed image which is compressed from the input image.

The compression quality evaluation system 110 is operatively connected with the system 100. It can receive configuration instructions therefrom to configure the quality measure used in the quality evaluation, or alternatively the quality measure can be configured directly by the system 100. According to certain embodiments, the compression quality evaluation system 110 can be further operatively connected to an image or video compression system which compresses or recompresses the input images based on the evaluation result.

According to certain embodiments, the functionality of the compression quality evaluation system 110, or at least part thereof, can be integrated within the system 100. By way of example, the system 100 can further comprise the compression quality evaluation system 110, and accordingly, instead of just configuring the quality measure in the compression quality evaluation system 110 or providing a configuration instruction to the compression quality evaluation system 110 to configure the quality measure, the system 100 can further evaluate the compression quality of the compressed to image in accordance with the configured quality measure.

According to certain embodiments, the system 100 can further comprise an I/O interface 112 and a storage module 114 operatively coupled to the other functional components described above. According to certain embodiments, the I/O interface 112 can be configured to obtain an input image and provide a configuration instruction to the compression quality evaluation system 110. The storage module 114 comprises a non-transitory computer readable storage medium. For instance, the storage module can include a buffer that holds one or more input images or frames. In another example, the buffer may also hold the compressed images or frames compressed from the input images. In yet another example, in case of the input being a plurality of frames of a video sequence, the buffer may also hold preceding frames of the current frame which can be used to calculate an inter-frame quality measure having a temporal component.

Those versed in the art will readily appreciate that the teachings of the presently disclosed subject matter are not bound by the system illustrated in FIG. 1 and the above exemplified implementations. Equivalent and/or modified functionality can be consolidated or divided in another manner and can be implemented in any appropriate combination of software, firmware and hardware.

While not necessarily so, the process of operation of system 100 can correspond to some or all of the stages of the methods described with respect to FIGS. 4A-4D. Likewise, the methods described with respect to FIGS. 4A-4D and their possible implementations can be implemented by system 100. It is therefore noted that embodiments discussed in relation to the methods described with respect to FIGS. 4A-4D can also be implemented, mutatis mutandis as various embodiments of the system 100, and vice versa.

Figure 2:
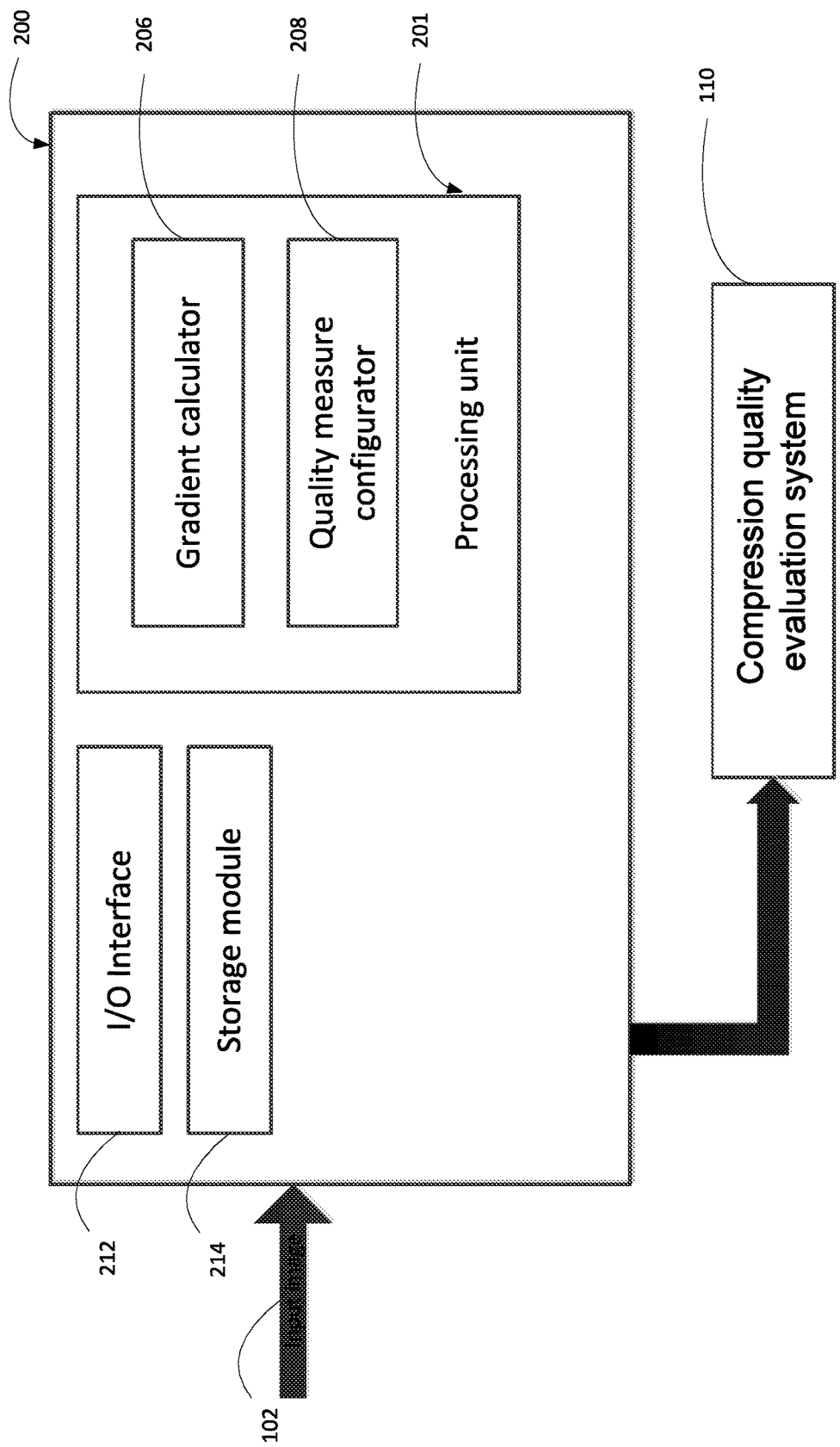
FIG. 2 is a functional block diagram schematically illustrating a second system for controlling a quality measure in a compression quality evaluation system in accordance with certain embodiments of the presently disclosed subject matter.

Turning now to FIG. 2, there is schematically illustrated a functional block diagram of a second system for controlling a quality measure in a compression quality evaluation system in accordance with certain embodiments of the presently disclosed subject matter.

According to certain embodiments, there is provided a second system 200 for controlling a quality measure in a compression quality evaluation system based on a gradient measure of an input image 102. The system 200 can comprise a processing unit 201 that includes a gradient calculator 206 and a quality measure configurator 208. The system 200 can be operatively connected to a compression quality evaluation system 110 for controlling the quality measure used therein. The functionality of the compression quality evaluation system 110 is described above with reference to FIG. 1.

Similarly, besides the smooth areas as aforementioned, the Human Visual System is also highly sensitive to the quality degradation in areas with color or brightness gradient (also termed as a color ramp or color progression) which specifies colors or brightness that vary continuously with position, producing smooth transitions or slow gradual spatial change in shades or colors. Thus there is a need to improve performance of the quality measures especially for images containing those areas. Furthermore, using block based encoding schemes as aforementioned in an image or video compression process may introduce blockiness and/or banding artifacts in gradient areas, as illustrated in FIG. 8.

Figure 8:
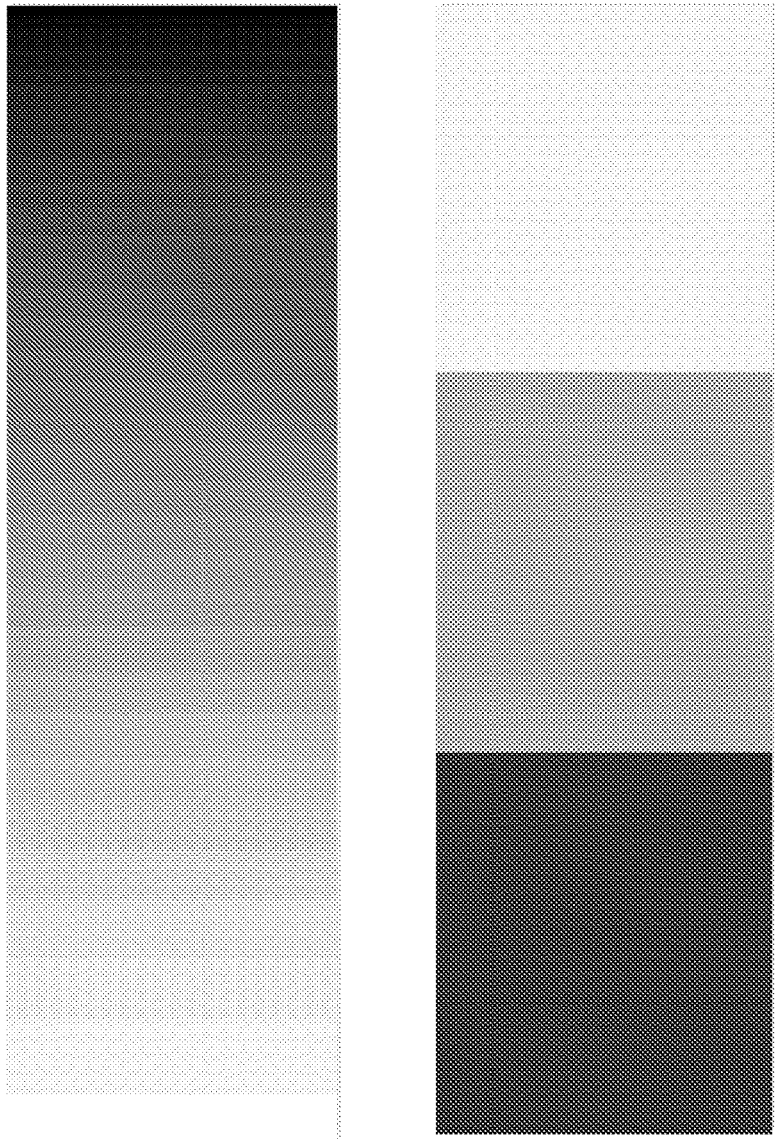
FIG. 8 is an exemplified illustration of an original image which contains gradient areas and a corresponding compressed image which has introduced compression artifacts in accordance with certain embodiments of the presently disclosed subject matter.

Turning now to FIG. 8, there is shown an exemplified illustration of an original image which contains gradient areas and a corresponding compressed image which has introduced compression artifacts in accordance with certain embodiments of the presently disclosed subject matter. As shown on the top of FIG. 8, there is shown an original image which comprises a gradient area with gradual spatial change in grayscale. At the bottom, there is shown the corresponding compressed image in which visible banding artifacts are introduced due to the block based compression scheme. Similarly as described above with reference to smooth areas, gradient areas may be present in both photo-realistic and synthetic images, although they are more prevalent in synthetic images.

Accordingly system 200 is provided to evaluate and quantify the presence of gradient areas in the input image and to configure the quality measure upon the presence of such areas, for improved compression or recompression control.

As illustrated in FIG. 2, the system 200 may receive the input image 102 which as aforementioned, can be a stand-alone image or at least one frame of a video sequence. According to certain embodiments, the gradient calculator 206 can be configured to calculating a gradient value indicative of an extent of gradual spatial changes of the input image 102. In some embodiments the gradient value of the input image can be calculated based on at least a portion of the input image indicating the gradual spatial changes of that portion of the image. The quality measure configurator 208 can configure a quality measure upon a gradient criterion being met by the gradient value, as will be described in further details below with reference to FIG. 5A. Alternatively, the quality measure configurator 208 can provide a configuration instruction for the compression quality evaluation system 110 to configure the quality measure used therein. As aforementioned, the quality measure is used in the compression quality evaluation system 110 as an indication of perceptual quality of a compressed image which is compressed from the input image.

The compression quality evaluation system 110 is operatively connected with the system 200. It can receive configuration instructions therefrom to configure the quality measure used in the quality evaluation, or alternatively the quality measure can be configured directly by the system 200. According to certain embodiments, the compression quality evaluation system 110 can be further operatively connected to an image or video compression system which compresses or recompresses the input images based on the evaluation result.

According to certain embodiments, the functionality of the compression quality evaluation system 110, or at least part thereof, can be integrated within the system 200. By way of example, the system 200 can further comprise the compression quality evaluation system 110, and accordingly, instead of just configuring the quality measure in the compression quality evaluation system 110 or providing a configuration instruction to the compression quality evaluation system 110 to configure the quality measure, the system 200 can further evaluate the compression quality of the compressed image in accordance with the configured quality measure.

According to certain embodiments, the system 200 can further comprise an I/O interface 212 and a storage module 214 operatively coupled to the other functional components described above. According to certain embodiments, the I/O interface 212 can be configured to obtain an input image and provide a configuration instruction to the compression quality evaluation system 110. The storage module 214 comprises a non-transitory computer readable storage medium. For instance, the storage module can include a buffer that holds one or more input images or frames. In another example, the buffer may also hold the compressed images or frames compressed from the input images. In yet another example, in case of the input being a plurality of frames of a video sequence, the buffer may also hold preceding frames of the current frame which can be used to calculate an inter-frame quality measure having a temporal component.

Those versed in the art will readily appreciate that the teachings of the presently disclosed subject matter are not bound by the system illustrated in FIG. 2 and the above exemplified implementations. Equivalent and/or modified functionality can be consolidated or divided in another manner and can be implemented in any appropriate combination of software, firmware and hardware.

Figure 5A:
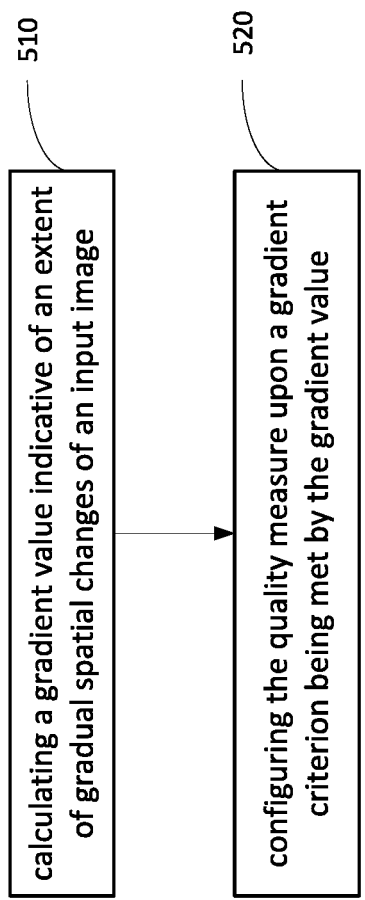
FIG. 5A is a generalized flowchart of controlling a quality measure in a compression quality evaluation system in accordance with certain embodiments of the presently disclosed subject matter.
Figure 5B:
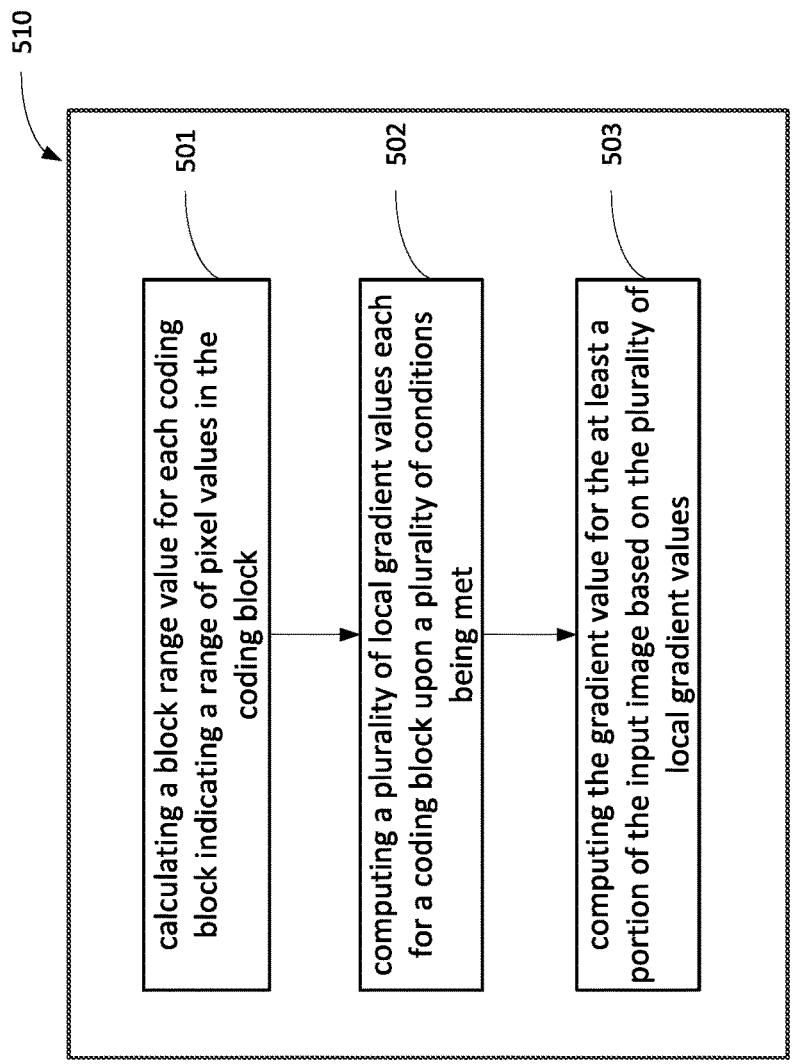
FIG. 5B is a generalized flowchart of the calculation of the gradient value based on a plurality of coding blocks in accordance with certain embodiments of the presently disclosed subject matter.
Figure 5C:
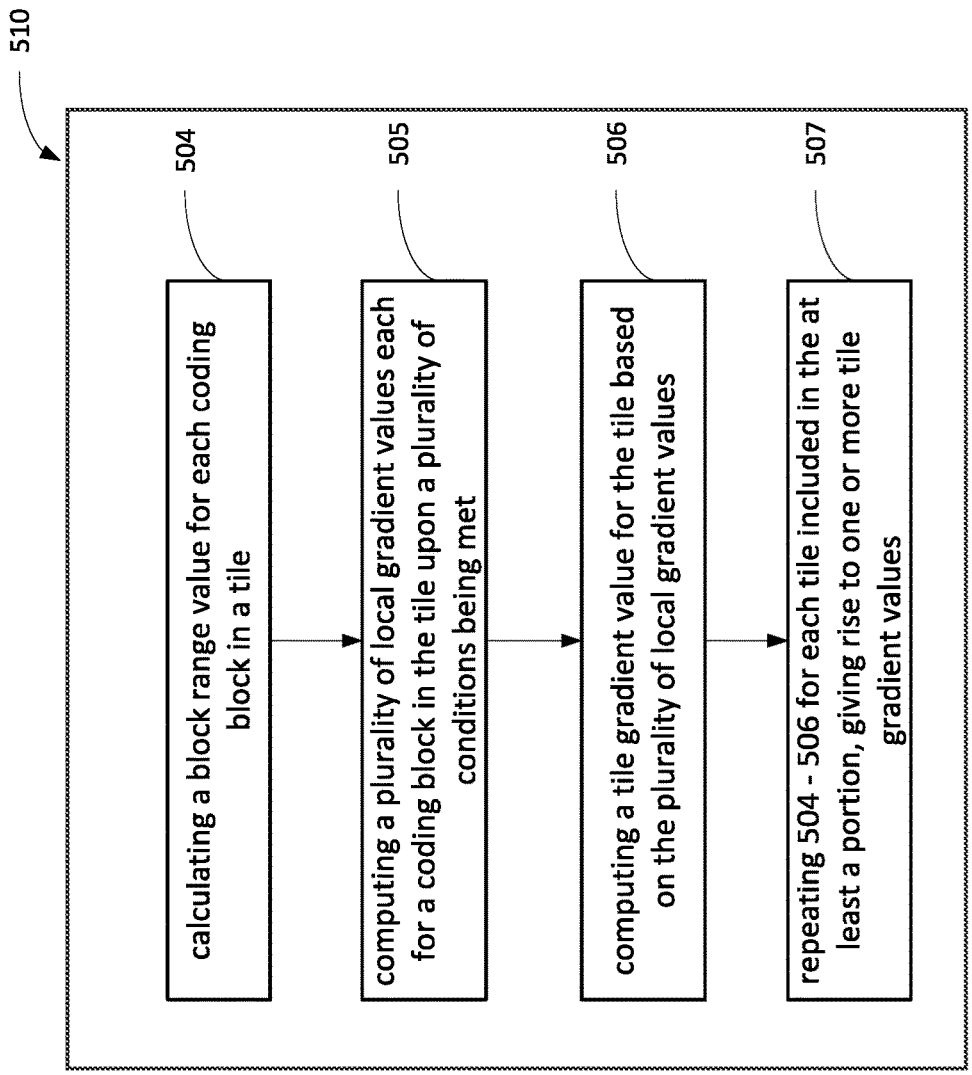
FIG. 5C is a generalized flowchart of calculation of a plurality of tile gradient values based on a plurality of tiles in accordance with certain embodiments of the presently disclosed subject matter.

While not necessarily so, the process of operation of system 200 can correspond to some or all of the stages of the methods described with respect to FIGS. 5A-5C. Likewise, the methods described with respect to FIGS. SA-5C and their possible implementations can be implemented by system 200. It is therefore noted that embodiments discussed in relation to the methods described with respect to FIGS. 5A-5C can also be implemented, mutatis mutandis as various embodiments of the system 200, and vice versa.

Figure 3:
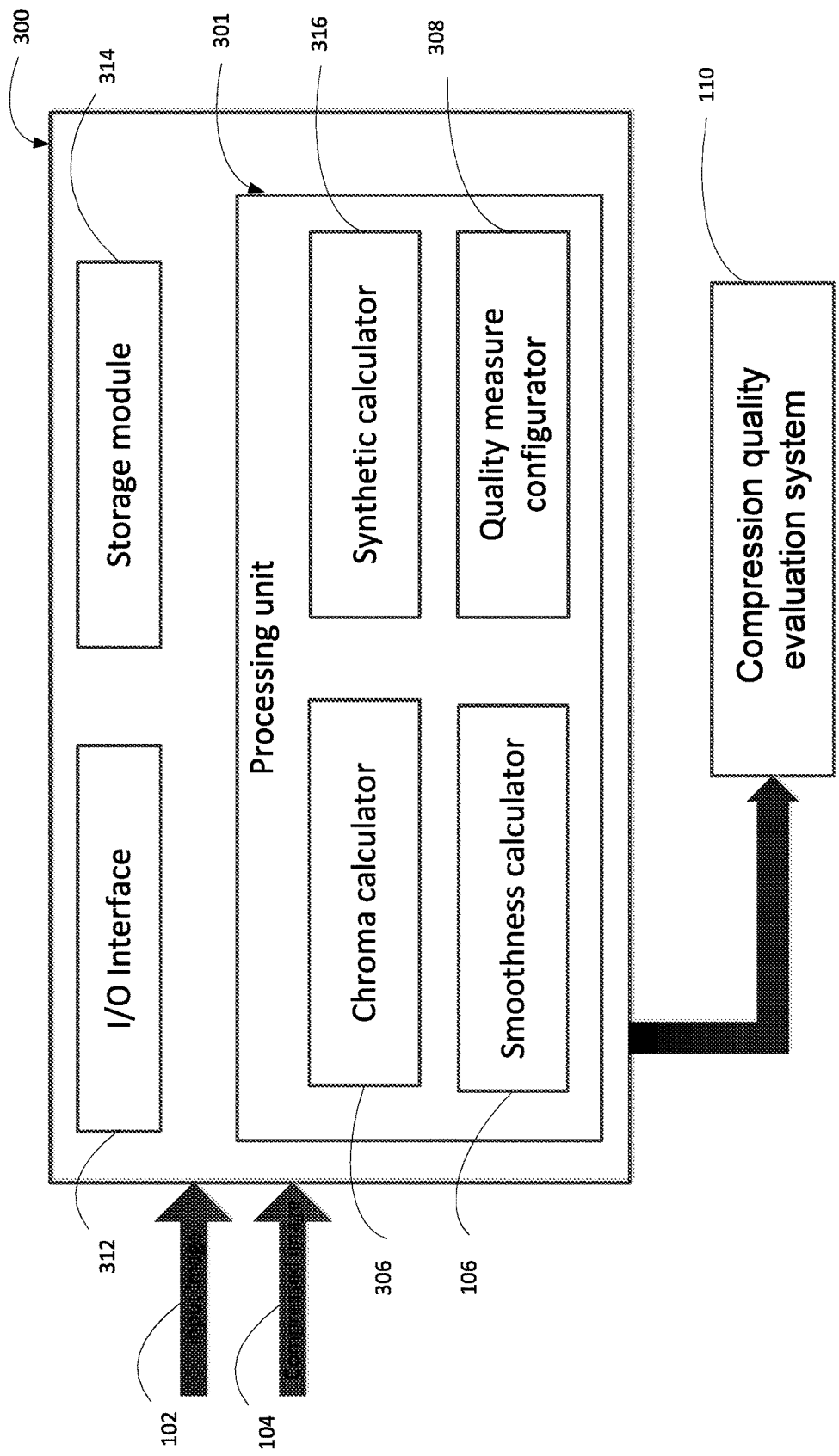
FIG. 3 is a functional block diagram schematically illustrating a third system for controlling a quality measure in a compression quality evaluation system in accordance with certain embodiments of the presently disclosed subject matter.

Turning now to FIG. 3, there is schematically illustrated a functional block diagram of a third system for controlling a quality measure in a compression quality evaluation system in accordance with certain embodiments of the presently disclosed subject matter.

According to certain embodiments, there is provided a third system 300 for controlling a quality measure in a compression quality evaluation system based on a chroma measure of an input image 102 and a compressed image 104. The system 300 can comprise a processing unit 301 that includes a chroma calculator 306 and a quality measure configurator 308. The system 300 can be operatively connected to a compression quality evaluation system 110 for controlling the quality measure used therein. The functionality of the compression quality evaluation system 110 is described above with reference to FIG. 1.

A digital image may comprise luminance (i.e. luma) information and chrominance (i.e. chroma) information. The luma information (also termed as luma component) can be represented in a luma plane (e.g., a Y plane in a YUV color model). The chroma information (also termed as chroma component) can be represented in one or more chroma planes (e.g., U plane and V plane in the YUV color model). The Human Visual System is generally much more sensitive to the luma component of an image than the chroma components. This leads to, for instance, common use of the subsampled chroma representation in image and video compression. This also leads to focus placed on luminance values when calculating an image quality measure, aiming to quantify how visually similar the input and compressed images are. For example, it is quite possible that in most cases calculating a local similarity measure will be performed using only the luma pixel values. In some computer generated graphic movies, e.g., particularly in high quality sophisticated animation, and particularly at high bitrates or quality working points, the chroma content is so rich, that the visual compression artifacts created by encoding the image without paying sufficient attention to chroma artifacts, may be un-acceptable.

Accordingly system 300 is provided to evaluate and quantify the level of chroma artifacts introduced in a compressed image in order to configure the quality measure to obtain more perceptually reliable compression results.

As illustrated in FIG. 3, the system 300 may receive an input image pair including an input image 102 and a corresponding compressed image 104. According to certain embodiments, the chroma calculator 306 can be configured to calculate a difference value indicative of an extent of difference between the input image 102 and the compressed image 104 of the image pair. In some embodiments the difference value can be calculated based on at least a portion of the input image and the compressed image indicating the difference between that portion of the input image and the compressed image. The quality measure configurator 308 can configure a quality measure upon a chroma artifact criterion being met by the difference value, as will be described in further details below with reference to FIG. 6A. Alternatively, the quality measure configurator 308 can provide a configuration instruction for the compression quality evaluation system 110 to configure the quality measure used therein. As aforementioned, the quality measure is used in the compression quality evaluation system 110 as an indication of perceptual quality of a compressed image which is compressed from the input image.

Applying the configuration of the quality measure upon the chroma artifact criterion being met, provides significant improvement in perceptual reliability of the quality measure in the target content, for example in very high quality sophisticated animation content. However, in some cases the chroma artifact criterion being met can also indicate that further configuration of the quality measure is required for certain photo-realistic images or movies, which is less desired, since system 300 aims at evaluating chroma artifacts of computer generated graphic movies with rich chroma content. In order to refrain from affecting the quality measure of such photo-realistic images or movies, there is a need to combine the chroma artifact measure with an additional indicator which can help identify computer graphic generated images.

Thus, according to certain embodiments, the processing unit 301 can further comprise a synthetic calculator 316 which can be configured to compute a synthetic value indicative of an extent of photo-realism of the input image, and to determine to invoke the calculation of the difference value by the chroma calculator 306 only upon a synthetic criterion being met by the synthetic value, as described below in details with reference to FIG. 10A. Without limiting the scope of the disclosure in any way, the term "photo-realism" or "phone-realistic" can be used to describe photographic content that is created by an optic device, for example, an image captured by a camera. It would be appreciated that an image that is captured by a camera can undergo digital processing, but as long as the digital processing is not overly extensive, the processed image remains "phone-realistic". Accordingly there can be numerous levels of "photo-realism". As further processing is applied to an image, its level of "photo-realism" decreases. By using the synthetic calculator 316, the calculation of the difference value will only be invoked when it is required such as, for example, for high quality animation, while will not be invoked for images or videos with more photo-realistic content.

In some cases, due to the realistic nature of sophisticated modern computer graphics, the synthetic content may not always be reliably separated from photo-realistic content, by using the synthetic calculator 316 alone. According to certain embodiments, the smoothness calculator 106 as described with reference to FIG. 1 can be used either separately, or in conjunction with the synthetic calculator 316 in order to provide a more reliable indication of synthetic content prior to the calculation of the difference value, since as aforementioned, although smooth content may appear in both photo-realistic and synthetic images, they are more prevalent in the synthetic images.

Thus according to certain embodiments, the processing unit 301 can further comprise the smoothness calculator 106 which can be configured to compute a smoothness value indicative of an extent of smoothness of the input image, and to determine to invoke the calculation of the difference value upon a smoothness criterion being met by the smoothness value, as described below in details with reference to FIG. 10B.

According to further embodiments, the processing unit 301 can further comprise both the smoothness calculator 106 and the synthetic calculator 316. The determination to invoke the calculation of the difference value can be made upon a criterion being met by both the synthetic value and the smoothness value, as described below in details with reference to FIG. 10C.

The compression quality evaluation system 110 is operatively connected with the system 300. It can receive configuration instructions therefrom to configure the quality measure used in the quality evaluation, or alternatively the quality measure can be configured directly by the system 300. According to certain embodiments, the compression quality evaluation system 110 can be further operatively connected to an image or video compression system which compresses or recompresses the input images based on the evaluation result.

According to certain embodiments, the functionality of the compression quality evaluation system 110, or at least part thereof, can be integrated within the system 300. By way of example, the system 300 can further comprise the compression quality evaluation system 110, and accordingly, instead of just configuring the quality measure in the compression quality evaluation system 110 or providing a configuration instruction to the compression quality evaluation system 110 to configure the quality measure, the system 300 can further evaluate the compression quality of the compressed image in accordance with the configured quality measure.

According to certain embodiments, the system 300 can further comprise an I/O interface 312 and a storage module 314 operatively coupled to the other functional components described above. According to certain embodiments, the I/O interface 312 can be configured to obtain an input image pair including the input image 102 and the compressed image 104, and provide a configuration instruction to the compression quality evaluation system 110. The storage module 314 comprises a non-transitory computer readable storage medium. For instance, the storage module can include a buffer that holds one or more input images or frames and the corresponding compressed images or frames. In another example, in case of the input being a plurality of frames of a video sequence, the buffer may also hold preceding frames of the current frame and the preceding compressed frames which can be used to calculate an inter-frame quality measure having a temporal component.

Those versed in the art will readily appreciate that the teachings of the presently disclosed subject matter are not bound by the system illustrated in FIG. 3 and the above exemplified implementations. Equivalent and/or modified functionality can be consolidated or divided in another manner and can be implemented in any appropriate combination of software, firmware and hardware.

Figure 6A:
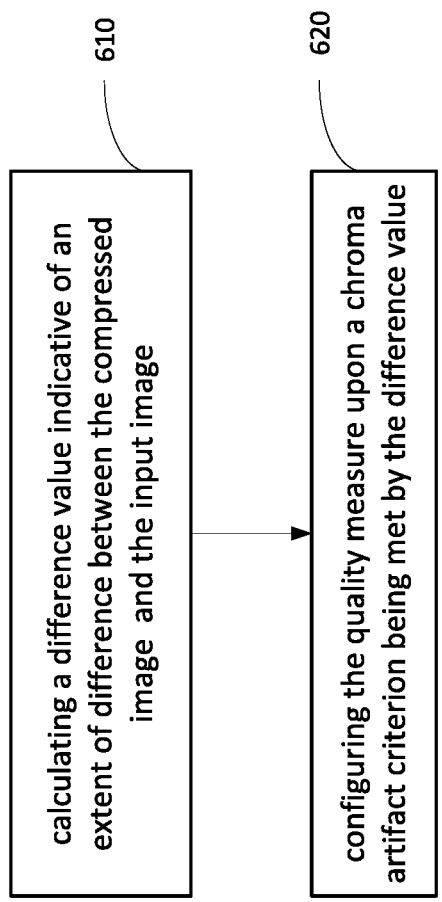
FIG. 6A is a generalized flowchart of controlling a quality measure in a compression quality evaluation system based on an input image pair including an input image and a corresponding compressed image compressed from the input image in accordance with certain embodiments of the presently disclosed subject matter.
Figure 6B:
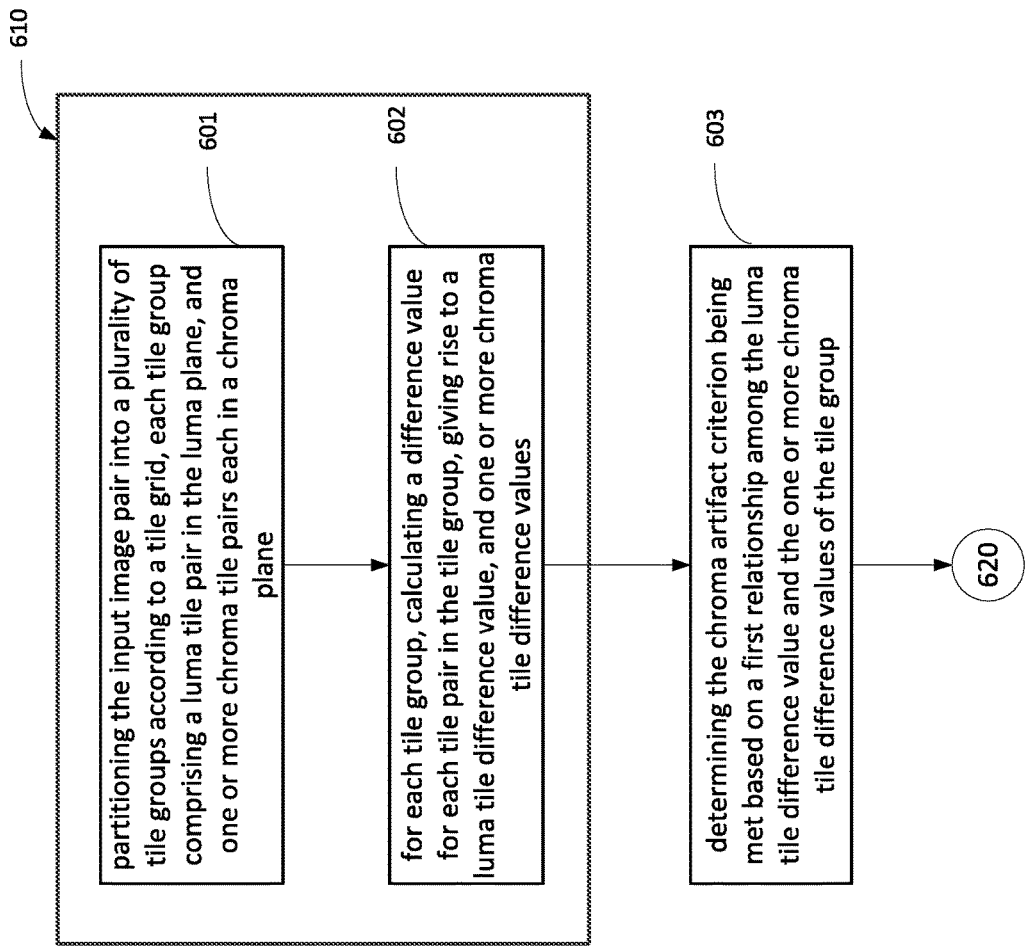
FIG. 6B is a generalized flowchart of calculation of the difference value in tile level and determination of the chroma artifact criterion being met in accordance with certain embodiments of the presently disclosed subject matter.
Figure 6C:
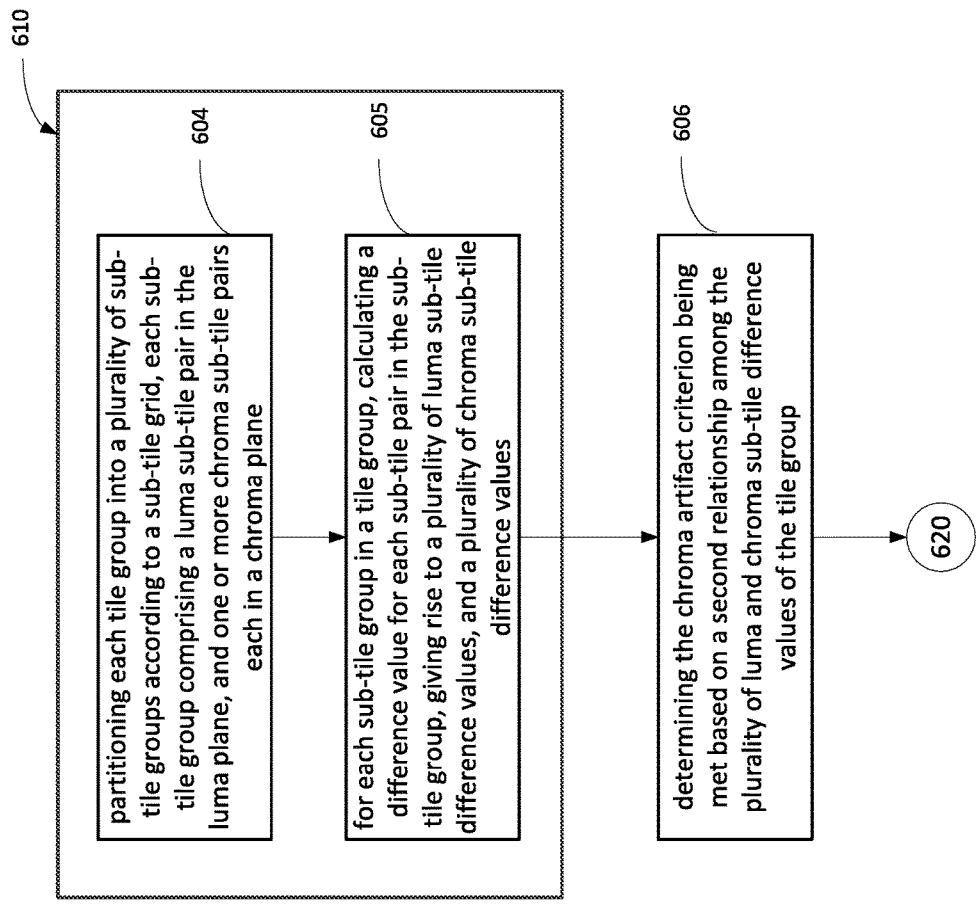
FIG. 6C is a generalized flowchart of calculation of the difference value in sub-tile level and determination of the chroma artifact criterion being met in accordance with certain embodiments of the presently disclosed subject matter.

While not necessarily so, the process of operation of system 300 can correspond to some or all of the stages of the methods described with respect to FIGS. 6A-6C. Likewise, the methods described with respect to FIGS. 6A-6C and their possible implementations can be implemented by system 300. It is therefore noted that embodiments discussed in relation to the methods described with respect to FIGS. 6A-6C can also be implemented, mutatis mutandis as various embodiments of the system 300, and vice versa.

Figure 4A:
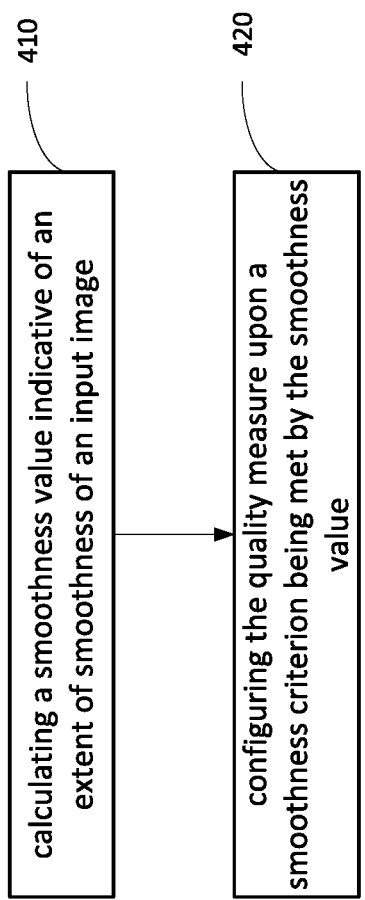
FIG. 4A is a generalized flowchart of controlling a quality measure in a compression quality evaluation system in accordance with certain embodiments of the presently disclosed subject matter.

Turning now to FIG. 4A, there is shown a generalized flowchart of controlling a quality measure in a compression quality evaluation system in accordance with certain embodiments of the presently disclosed subject matter.

According to certain embodiments, the controlling process of the quality measure is done based on a smoothness measure, as described in details as follows. A smoothness value indicative of an extent of smoothness of an input image can be calculated (410) (e.g., by the smoothness calculator 106 in FIG. 1). According to certain embodiments, the calculation of the smoothness value can be based on at least a portion of the input image. The portion can be, for example, a certain percentage of the input image, a region at a predetermined location of the input image (e.g., the center of the image), etc. In one embodiment, the calculation can be performed based on the entire input image.

Figure 4B:
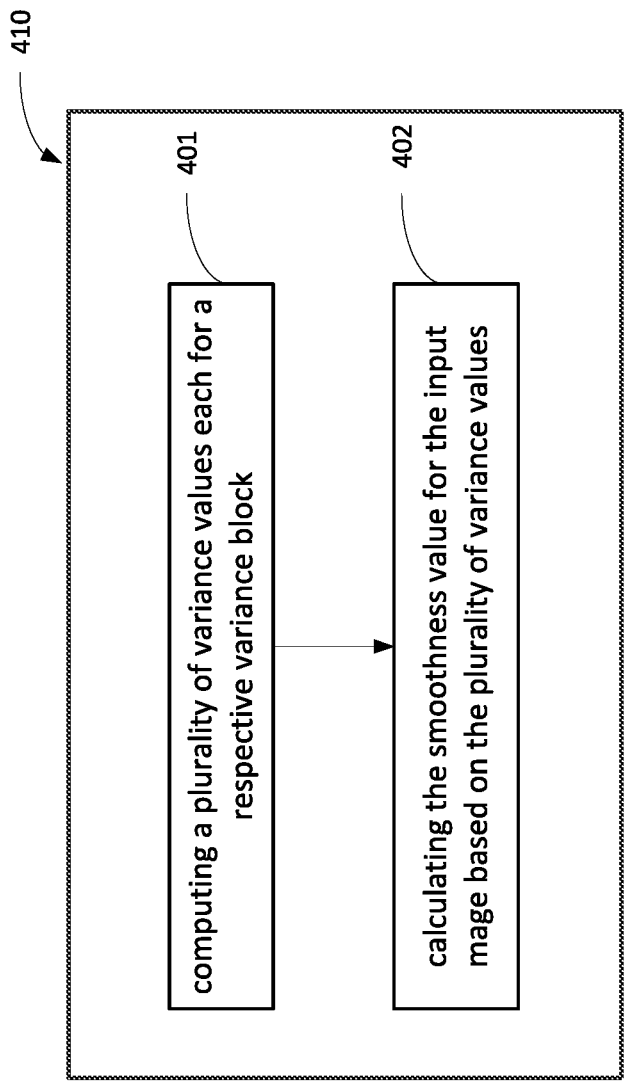
FIG. 4B is a generalized flowchart of calculating the smoothness value based on a plurality of variance blocks in accordance with certain embodiments of the presently disclosed subject matter.

According to certain embodiments, the calculation can be performed based on the structure and the composition of the at least a portion, which in turn can be determined based on different partitioning of the input image. In one embodiment, the input image can be partitioned into multiple variance blocks. A variance block is a fraction of the input image that comprises a group of pixels. The size of the variance block can be determined such that it is big enough to obtain representative information of the variance among pixel values in a localized area, but not too big such that it may be impossible to obtain such localized variance indication. For instance, the variance block can be in the size of 4 pixel*4 pixel, or 8 pixel*8 pixel, etc. A variance block can be in the size of a coding block of the input image, or alternatively, it can be in different sizes other than the size of a coding block. Accordingly the at least a portion can comprise a plurality of variance blocks, and the calculation of the smoothness value (410) can include the following steps, as illustrated in FIG. 4B: computing (401) a plurality of variance values each for a respective variance block, each variance value representing a statistical variance of pixel values in the respective variance block; and calculating (402) the smoothness value for the input mage based on the plurality of variance values. An example of a possible routine for computation of a variance value for a variance block A can be as follows:

The mean of A, an N×N (e.g. 4×4 or 8×8) variance block of values A[i][j] with i=1, . . . , N, j=1, . . . N is given by:

$$mean_{N \times N}(A) = \frac{1}{N^2} \sum_{i=1}^{N} \sum_{j=1}^{N} A[i][j] \qquad \text{Formula 1}$$

Then, the variance of A, an N×N block of values A[i][j] with i=1, . . . N, j=1, . . . N is computed as follows, i.e. the mean absolute difference between the block values and the block mean:

$$V_{N \times N}(A) = \frac{1}{N^2} \sum_{i=1}^{N} \sum_{j=1}^{N} |A[i][j] - mean_{N \times N}(A)| \qquad \text{Formula 2}$$

In another embodiment, the input image can be partitioned into multiple superblocks each comprising one or more variance blocks. The size of the superblock can be determined such that the variance behaviors among different variance blocks included therein can be observed. By way of example, the superblock can comprise 16*16 variance blocks. In the case that the variance block is a 4 pixel*4 pixel block, the superblocks is in the size of 64 pixel*64 pixel. It is to be noted that the sizes of the variance block and the superblock are illustrated for exemplified purposes only and should not be construed to limit the disclosure in any way. Alternative sizes can be applied in addition or in lieu of the above.

Figure 4C:
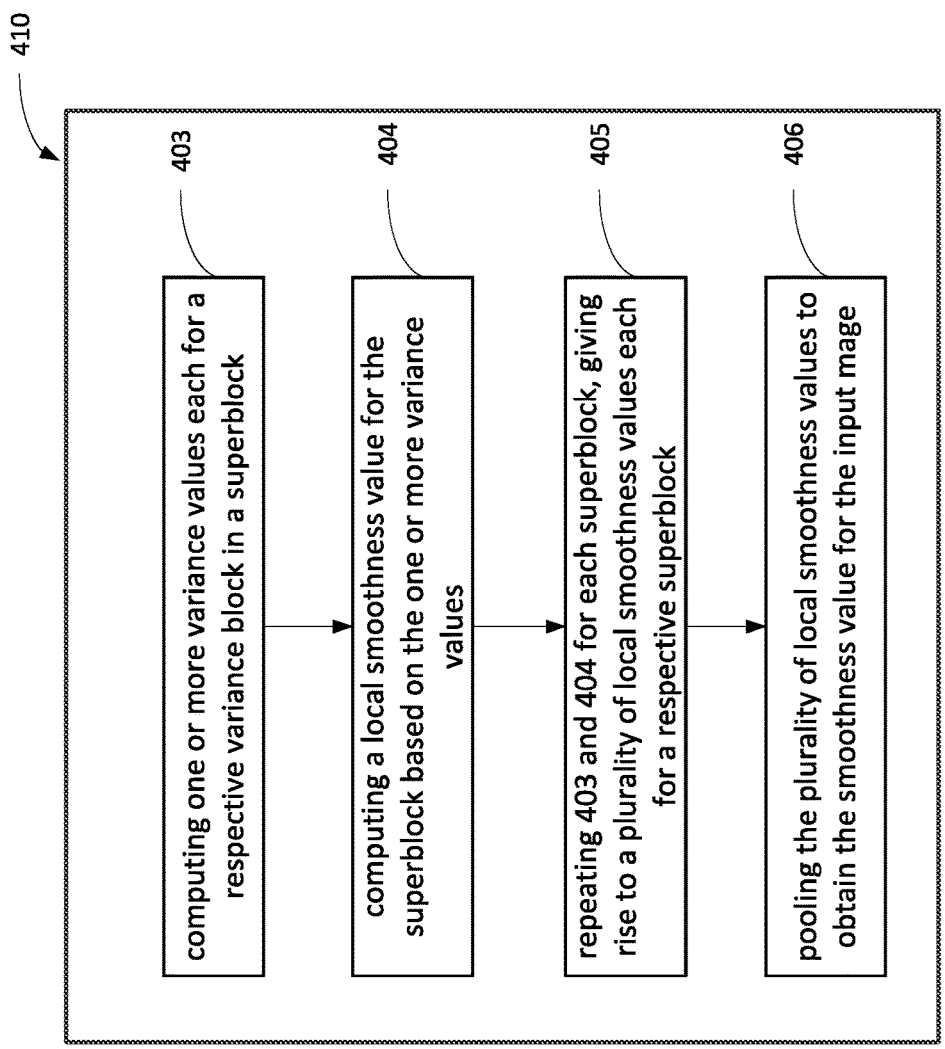
FIG. 4C is a generalized flowchart of calculating the smoothness value based on a plurality of superblocks each including one or more variance blocks in accordance with certain embodiments of the presently disclosed subject matter.

Accordingly the at least a portion can comprises a plurality of superblocks each including one or more variance blocks, and the calculation of the smoothness value (410) can include the following steps, as illustrated in FIG. 4C:

i) One or more variance values can be computed (403) each for a respective variance block in a superblock. Each variance value represents a statistical variance of the pixel values in the respective variance block. The calculation of each variance value can be performed in a similar manner as described above with reference to Formula 1 and Formula 2.

ii) A local smoothness value for the superblock can be computed (404) based on the one or more variance values. By way of example, in the case the superblock comprise 16*16 variance blocks, the local smoothness value can be determined based on an average value of the 16×16 variance values. Optionally, the local smoothness value can be further normalized to a predetermined range, e.g., [0, 1].

iii) The above computation included in steps i) and ii) can be repeated (405) for each superblock included in the at least a portion of the input image, giving rise to a plurality of local smoothness values each for a respective superblock.

iv) The plurality of local smoothness values can be pooled (406) together to obtain the smoothness value for the input mage, i.e. an image smoothness value. The pooling can be performed based on at least one of the following: an average value of the plurality of local smoothness values (referred below also as mean(localSmooth)), a maximal local smoothness value of the plurality of local smoothness values (referred below also as max(localSmooth)), and a minimal local smoothness value of the plurality of local smoothness values. In one embodiment, the image smoothness value can be derived as a combination of the average value and the maximal local smoothness value. Different weights can also be applied to these values in order to improve the result to be more reliable. For example, the image smoothness value can be generated as a weighted average: W1*mean(localSmooth)+W2*max(localSmooth), wherein W1 and W2 are weight factors applied to respective values. Optionally, the image smoothness value can be further normalized, e.g., by applying further scaling and clipping operations, to yield a smoothness value within a predetermined range, e.g., [0, 1]. For example, in some cases a smoothness value 1 can indicate an image with substantial smooth content.

In yet another embodiment, the input image can be partitioned into multiple tiles. The size of a tile can be determined such that the image is divided into a predetermined number of tiles, or such that tiles have a predetermined dimension which may or may not be dependent on the image dimensions. The tile size may also be adapted such that the tile grid can be aligned with coding block boundaries. Tile dimensions can be some multiple of coding block size, such as, e.g., 64×64, 80×80, 128×128, or 256× 256, or 160×128, etc. In some cases the partitioned tiles may not completely cover the image and there may be some regions remained unpartitioned, e.g., on the margins of the image. Further by way of example, the tiles can be square but can also have other shapes or forms. Still further by way of example, tile size can be adapted for instance according to frame resolution, such that, for example, smaller tiles can be used for smaller frames. Yet further by way of example, tile size can be calculated according to the number of tiles that would fit into a given frame, with possible rounding to a whole multiple of coding block size.

Accordingly the at least a portion can comprise one or more tiles, and the calculation of the smoothness value (410) can be performed, e.g., by calculating one or more tile smoothness values each for a tile. Each tile smoothness value can be indicative of an extent of smoothness of the tile. The quality measure can be configured upon the smoothness criterion being met by at least one tile smoothness value of at least one tile.

According to certain embodiments, the input image can be partitioned into multiple tiles, each tile comprising one or more superblocks, and each superblock including one or more variance blocks. Accordingly the smoothness value can be calculated as follows: calculating variance values for respective variance blocks, computing local smoothness values each for a superblock based on the variance values in the superblock, and computing tile smoothness values each for a tile based on the local smoothness values in each tile. Optionally, the tile smoothness values can be further pooled to obtain an image smoothness value.

It is to be noted that the above described different ways of partitioning the input image (e.g., tiles, superblocks, variance blocks, etc) are illustrated for exemplified purposed only and should not be construed to limit the disclosure in any way. Other suitable ways to partition the input image and other sizes of the partitions can be applied in addition or in lieu of the above.

According to certain embodiments, certain area of the at least a portion of input image can be excluded from the calculation of the smoothness value upon a condition being met. The condition can be that, for instance, no pixel value of the area exceeds a darkness threshold (i.e. all the pixel values in this area are below the darkness threshold), considering the fact that darker pixels generally have lower pixel values compared to lighter pixels. This exclusion can be especially useful to avoid false alarms due to frames around an image, or black stripes above and below as appear often for video frames, which are areas that should not be taken into consideration when calculating a smoothness value for the image. In other words, the area that is included for the calculation of the smoothness value includes at least one pixel value that exceeds a darkness threshold.

Having described various embodiments of the calculation of the smoothness value with reference to block 410 in FIG. 4A, there is now described exemplified configurations of the quality measure upon a smoothness criterion being met by the smoothness value with reference to block 420 of FIG. 4A.

According to certain embodiments, the determination of whether the smoothness criterion is met can be performed by comparing the calculated smoothness value with a predefined smoothness threshold. In some cases, if the smoothness value equals or exceeds the smoothness threshold, it can be determined that the smoothness criterion is met. Alternatively, in other cases, it can be determined that the smoothness criterion is met if the smoothness value is equal or below the threshold.

According to certain embodiments, configuring the quality measure can include configuring a local similarity measure upon the smoothness value meeting a smoothness criterion.

A local similarity measure can quantify local similarities between the input image and the compressed image. The localized similarity measure may comprise a normalized Peak signal-to-noise ratio (PSNR). However, this is not intended to be limiting and instead, the localized similarity measure is intended to include any monotonic function, such as but not limited to a sum of squares, of substantially each of the differences between attributes of, e.g. color values of, corresponding small portions, such as pixels, of the image before and after compression, wherein any suitable difference function such as but not limited to absolute value of subtraction is used. It is appreciated that use of log of the sum of mean squares of pixel by pixel similarity values is just one possible localized similarity measure which is not intended to be limiting. The level of localized similarity need not be the pixel level, other combining functions may be used other than the sum of mean squares, and so forth. An exemplified illustration of the local similarity measure is described in U.S. Pat. No. 8,908,984 issued on Dec. 9, 2014, which is incorporated herein in its entirety by reference in particular, see, e.g., column 36 lines 29-40.

Figure 4D:
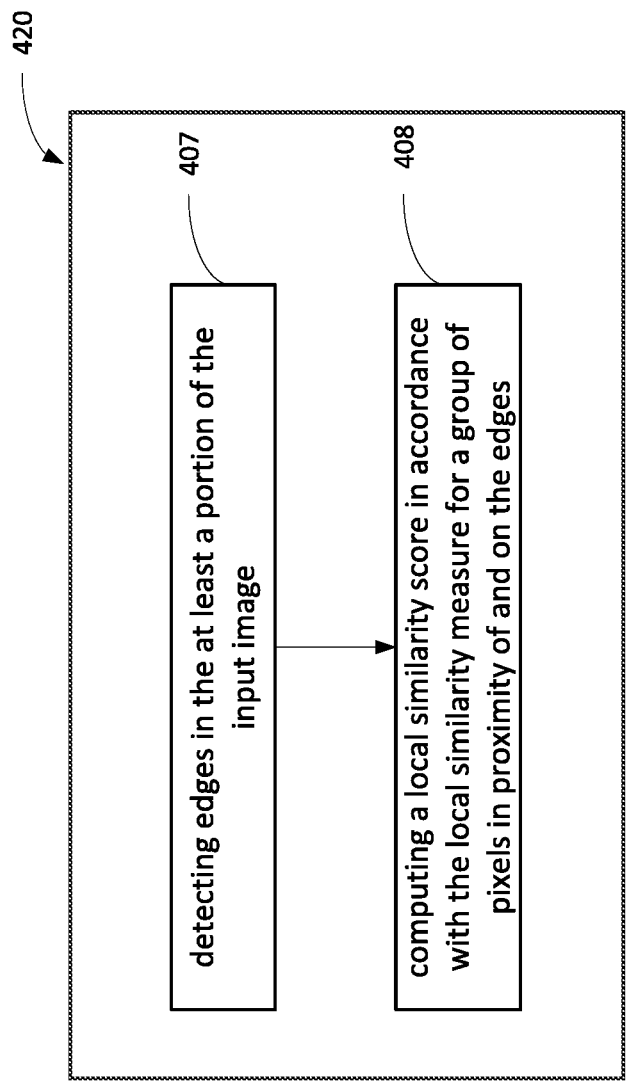
FIG. 4D is a generalized flowchart of configuration of the local similarity measure in accordance with certain embodiments of the presently disclosed subject matter.

In smooth images, or smooth areas within an image, it is of particular importance to preserve the quality around edges, where the compression artifacts such as blockiness and ringing may appear and be visibly obvious to the human eye. According to certain embodiments, the configuration of the local similarity measure can include to perform the local similarity measure only around edges in the input image, as illustrated in FIG. 4D. Specially, edges, such as, e.g., real edges indicative of discontinuity of pixel values in an original input image, can be detected (407) in the at least a portion of the input image. The detection of edges can be performed, e.g., by calculating an edge map for the at least a portion of the image. Since the smoothness value of the at least a portion meets the smoothness criterion indicating that it is a smooth image area, if desired a relatively simple or low complexity edge map detection, such as, e.g., Sobel, can be used in some cases and will be sufficient. Then, a local similarity score can be computed (408) in accordance with the local similarity measure for a group of pixels in proximity of and on the edges. For instance, the computation of the local similarity score is only performed for the pixels in an N×N (e.g., 3×3, as exemplified in FIG. 7B) region around each edge pixel that are identified in the edge map. As shown in FIG. 7B, the edge of the circle has been detected, and a surrounding 3×3 region around each edge pixels can be selected for implementing the local similarity measure. Such configuration of the quality measure can provide a more effective way of compression quality evaluation since it focuses only on the important area of the image that may be highly likely to cause compression artifacts.

It is to be noted that the local similarity measure is only one kind of quality measure that can be used to evaluate the overall image degradation in the compression quality evaluation system 110, thus it is only one kind of quality measure that can be configured by using the smoothness value. Other suitable quality measures, such as a texture measure, a measure of Added Artifactual Edges, or a combined quality measure combining inter-frame and intra-frame quality measures, as described in US patent application publication No. 2014/0211859 published on Jul. 31, 2014, which is incorporated herein in its entirety by reference, in particular, see paragraphs [0132]-[0149] for an example of a pixel-wise intra-frame quality measure and paragraphs [0151]-[0178] for an example of an inter-frame quality measure, as well as paragraphs [0179]-[0242]. These quality measures can be used either separately or in combination thereof, to be configured by using the smoothness value.

It is to be noted that the above described different configuration schemes are illustrated for exemplified purposed only and should not be construed to limit the disclosure in any way. Other suitable ways to configure a quality measure upon the smoothness criterion being met by a smoothness value of the image or a tile smoothness value can be applied in addition or in lieu of the above.

Turning now to FIG. 5A, there is shown a generalized flowchart of controlling a quality measure in a compression quality evaluation system in accordance with certain embodiments of the presently disclosed subject matter.

According to certain embodiments, the controlling process of the quality measure is done based on a gradient measure, as described in details as follows. A gradient value indicative of an extent of gradual spatial changes of an input image can be calculated (510) (e.g., by the gradient calculator 206 in FIG. 2). According to certain embodiments, the calculation of the gradient value can be based on at least a portion of the input image. As aforementioned, the portion can be, for example, a certain percentage of the input image, a region at a predetermined location of the input image (e.g., the center of the image), etc. In one embodiment, the calculation can be performed based on the entire input image.

According to certain embodiments, the calculation of the gradient value can be performed based on the structure and the composition of the at least a portion, which in turn can be determined based on different partitioning of the input image. In one embodiment, the input image can be partitioned into multiple coding blocks. It is known that for image or video compression that is based on a block-level coding/encoding scheme (also termed as block-based coding/encoding scheme, or block transform coding/encoding scheme, etc), the input image is divided into coding blocks. In certain embodiments, a coding block can include one or more transform blocks that the transform is applied on. The size of a transform block varies for different coding schemes. By way of example, a transform block can be an 8 pixel×8 pixel block for JPEG, 4 pixel×4 pixel for H.264, and 8 pixel×8 pixel for H.264 High Profile. It is to be noted that for purpose of exemplified illustration, the following description is provided with respect to coding blocks. In the case that a coding block includes multiple transform blocks, embodiments are, likewise, applicable to a sub unit of the coding block, e.g., a transform block.

By way of example, the block-based encoding scheme can include but is not limited to one of: MPEG-1, MPEG-2, H.261, H.263, MPEG-4 Part2, MPEG-4 part10, AVC, H.264, HEVC, Motion-JPEG. VP8. VP9, VC-1, WebM or ProRes. In some cases the block-based encoding scheme can be an encoding scheme utilizing a Discrete Cosine Transform (DCT).

Accordingly the at least a portion can comprise a plurality of coding blocks, and the calculation of the gradient value (510) can include the following steps, as illustrated in FIG. 5B:

i) A block range value indicating a range of pixel values in a coding block can be calculated (501) for each coding block. According to certain embodiments, for each coding block, a maximum pixel value (also referred below as maxVal) and a minimum pixel value (also referred below as minVal) in the block can be found. The difference between these two values provides the block range value for the coding block. Optionally, the block range value can be further normalized, such as, for example:

$$\text{Block Range Value} = \frac{maxVal - minVal}{maxVal + minVal}.$$

ii) A plurality of local gradient values can be computed (502) each for a coding block upon a plurality of conditions being met. According to certain embodiments, the plurality of conditions can include:
   a) The block range value of the coding block is below a first threshold which indicates that there is no extreme change within the coding block and only slow and gradual changes exist. By way of example, in some cases the first threshold can be set as 0.02.
   b) The block range value of at least one adjacent coding block of the coding block is also below the first threshold. An adjacent coding block can be one of the neighboring blocks of the coding block which are, for example, the upper block, lower block, left block and right block next to the coding block. It can be predetermined which adjacent coding block(s) to be examined in this step. In one embodiment, it is enough that the block range value of one adjacent coding block, e.g., the left block, falls below the first threshold. In another embodiment, it can be determined that the block range values of more than one adjacent coding blocks, e.g., the left block and the upper block, should fall below the first threshold.
   c) At least one block pair range value indicating a range of pixel values in a block pair meets a range criterion. A block pair includes the coding block and one of the at least one adjacent coding block of which the block range value is below the first threshold, as determined in above step b). For example, if it is determined that the left block and the upper block are used for examination in step b), and both block range values of the left and upper blocks are below the first threshold, then there will be two block pairs one including the coding block with the left block, and the other one including the coding block with the upper block. In one embodiment, if the block pair range value of one of these pairs meet the range criterion, it can be determined that the condition is met. Alternatively, it can be determined that both block pair range values need to meet the range criterion such that the condition is met.

The range criterion can be set as that the block pair range value is larger than the block range value and smaller than a second threshold, such that it will not be so much larger that it may indicate an actual edge. For instance, the range criterion can be set as: block range value<block pair range value≤2*block Range value+n, wherein n can be a number predetermined for the consideration of slight changes in pixel values which still do not indicate presence of significant differences.

If all the above conditions a), b) and c) are met, a local gradient value is computed for the coding block based on the block range value of the coding block and the at least one block pair range value.

It is to be noted that the above conditions a), b) and c) are illustrated for exemplified purposes only, and should not be construed to limit the disclosure in any way. Other suitable conditions for determining gradual changes can be applied in addition or in lieu of the above.

iii) The gradient value for the at least a portion of the input image can be computed (503) based on the plurality of local gradient values. By way of example, the gradient value is computed based on at least one of the following: an average of the plurality of local gradient values, a maximal local gradient value, and a minimal local gradient value.

In another embodiment, the input image can be partitioned to multiple tiles, as aforementioned with reference to the calculation of the smoothness value. Accordingly the at least a portion of the input image can comprise one or more tiles, the calculation of the gradient value (510) can be performed, e.g., by calculating one or more tile gradient values each for a tile. Each tile gradient value can be indicative of an extent of gradual spatial changes of the tile. The quality measure can be configured upon a gradient criterion being met by at least one tile gradient value of at least one tile.

Specifically, according to certain embodiments, each tile can comprise a plurality of coding blocks, and the calculation of the plurality of tile gradient values can include the following steps, as illustrated in FIG. 5C:
   i) A block range value is calculated (504) for each coding block in a tile, in a similar manner with reference to above block 501 of FIG. 5B. The block range value indicates a range of pixel values in the coding block.
   ii) A plurality of local gradient values are computed (505) each for a coding block in the tile upon a plurality of conditions being met, as described in details with reference to above block 502 of FIG. 5B.
   iii) A tile gradient value can be computed (506) for the tile based on the plurality of local gradient values, in a similar manner with reference to above block 503 of FIG. 5B.
   iv) The above steps i)-iii) can be repeated (507) for each tile included in the at least a portion, giving rise to the one or more tile gradient values.

It is to be noted that the above described different ways of partitioning the input image (e.g., tiles, coding blocks, etc) are illustrated for exemplified purposed only and should not be construed to limit the disclosure in any way. Other suitable ways to partition the input image and other sizes of the partitions can be applied in addition or in lieu of the above.

Having described various embodiments of the calculation of the gradient value with reference to block 510 in FIG. 5A, there is now described exemplified configurations of the quality measure upon a gradient criterion being met by the gradient value with reference to block 520 of FIG. 5A.

According to certain embodiments, the determination of whether the gradient criterion is met can be performed by comparing the calculated gradient value with a predefined gradient threshold. In some cases, if the gradient value equals or exceeds the gradient threshold, it can be determined that the gradient criterion is met. Alternatively, in other cases, it can be determined that the gradient criterion is met if the gradient value is equal or below the threshold.

According to one embodiment, configuring the quality measure can include adjusting a quality criterion of the quality measure based on the gradient value of the input image. In the case that the input image comprises tiles and one or more tile gradient values are calculated as described with reference to FIG. 5C, configuring the quality measure can include adjusting a quality criterion of the quality measure based on the at least one tile gradient value that meets the gradient criterion.

The quality criterion can include a target quality threshold which can be used to compare with a quality score calculated for the compressed image or video in accordance with the quality measure and determine whether the perceptual quality of the compressed image or video meet such criterion based on the comparison result. According to certain embodiments, the target quality threshold can be adjusted by adding an offset such as, e.g., $\alpha \times gradM^\beta$, to the threshold based on the calculated gradient value, where gradM is the calculated gradient value, and $\alpha$ and $\beta$ are the weighting factors. It is to be noted that adding the offset in the form of αxgradM$^β$ is only one possible way of implementing the adjustment which is not intended to be limiting. Other suitable forms may be used in addition or in lieu of the above form.

According to certain embodiments, the quality measure can include a quality measure of added artifactual edges, and the configuration of the quality measure can include adjusting a quality criterion of the quality measure of added artifactual edges (also termed as blockiness measure) based on the gradient value of the input image. Blockiness as a result of image compression is well known phenomenon in compressed digital images. According to relevant art, blockiness refers to block boundary artifacts introduced by the block-based coding scheme, which appears as discontinuities and visible artifactual edges at the block boundaries, as illustrated in FIGS. 7A and 8. The blockiness measure typically measure the presence of added artifactual edges along coding block boundaries which are typically absent from the first image and are added/introduced in the second image by the compression process, as described in U.S. Pat. No. 8,908,984 issued on Dec. 9, 2014, which is incorporated herein in its entirety by reference, in particular, see column 36 line 57-column 37 line 61.

Banding, as shown in FIG. 8, is one kind of blockiness artifacts introduced in gradient areas of a compressed image as compared to the original image. In order to reduce banding artifacts introduced in gradient areas, the quality criterion of the quality measure can be adjusted by applying a stricter target quality threshold for the blockiness measure of the quality measure according to the gradient value of the input image. By way of example, the threshold for the blockiness measure (also referred to as blockinessTHR) which was previously set to a fixed value of, e.g., T, in accordance with certain embodiments can be adjusted as: blockinessTHR=Ta+b*(1−gradM), wherein gradM is the calculated gradient value, Ta is a lower threshold and b is a weight factor (e.g., Ta and b meet the following condition: Ta<T, and Ta+b=T). Thus, for instance, if the gradM is calculated as 1 indicating that the extent of gradient included in the input image is huge, then the blockiness threshold will be adapted to a stricter level as Ta. On the other hand, if the gradM is calculated as 0 indicating that there is basically no gradient area in the input image, then the blockiness threshold will be maintained as the original value T.

In the case that the input image comprises tiles and one or more tile gradient values are calculated as described with reference to FIG. 5C, configuring the quality measure can include adjusting a quality criterion of the quality measure of added artifactual edges based on the at least one tile gradient value that meets the gradient criterion. Specifically, continuing with the above example where the blockiness threshold can be adjusted as: blockinessTHR=Ta+b*(1−gradM), the gradM used in the formula should be the tile gradient value instead of the gradient value for the input image.

Figure 9:
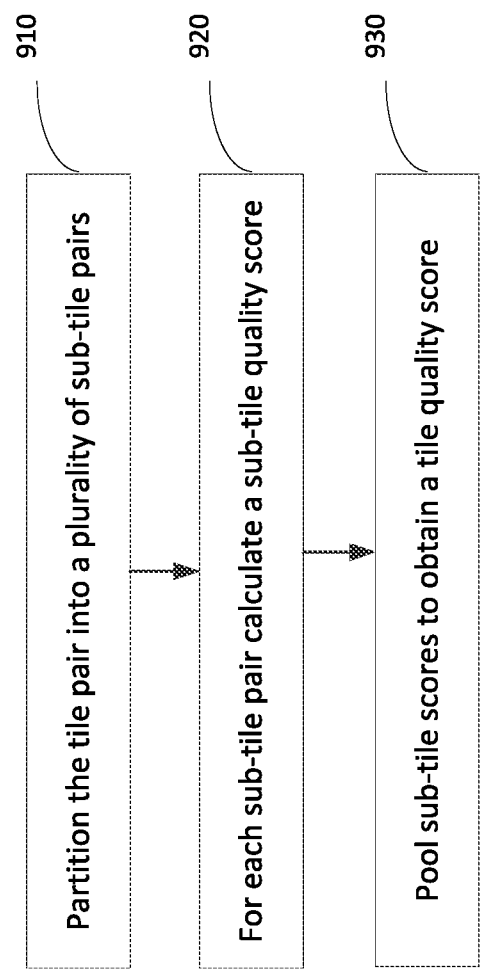
FIG. 9 is a generalized flowchart of a sub-tiling process in accordance with certain embodiments of the presently disclosed subject matter.

According to further embodiments, for at least one tile with a tile gradient value that meets the gradient criterion, a sub-tile pooling process can be determined to apply in the calculation of the tile quality score. Specifically, the sub-tile pooling can be performed for each tile with a tile gradient value that meets the gradient value, including the following steps, as illustrated in FIG. 9.

i) A tile pair including the tile and a corresponding compressed tile in the compressed image can be partitioned (910) to a plurality of sub-tile pairs, each sub-tile pair including a sub-tile and a corresponding compressed sub-tile;

ii) A sub-tile quality score can be calculated (920) for each sub-tile pair in accordance with the quality measure, giving rise to a plurality of sub-tile quality scores for the tile.

iii) The sub-tile quality scores can be pooled (930) together to form a tile quality score.

Without limiting the disclosure in any way, an exemplified sub-tiling process is described in US patent application publication No. 2014/0211859 published on Jul. 31, 2014, which is incorporated herein in its entirety by reference, in particular, see FIG. 4, paragraphs 134-138, and paragraphs 162-177 for using sub-tiling in the context of an exemplified inter-frame quality measure. According to one embodiment, the above sub-tile pooling can be applied to the calculation of a local similarity score in accordance with a local similarity measure that quantifies local similarities between the input image and the compressed image, as described above. In another embodiment, the sub-tile pooling can be applied to any other suitable quality measures, in addition or in lieu of the local similarity measure.

It is to be noted that the above described different configuration schemes are illustrated for exemplified purposed only and should not be construed to limit the disclosure in any way. Other suitable ways to configure a quality measure based on a gradient value of the input image or a tile gradient value of a tile can be applied in addition or in lieu of the above.

Turning now to FIG. 6A, there is shown a generalized flowchart of controlling a quality measure in a compression quality evaluation system based on an input image pair including an input image and a corresponding compressed image compressed from the input image in accordance with certain embodiments of the presently disclosed subject matter.

According to certain embodiments, the controlling process of the quality measure is done based on a chroma artifact measure, as described in details as follows. A difference value indicative of an extent of difference between the input image and the compressed image can be calculated (610) (e.g., by the chroma calculator 306 in FIG. 3) for the image pair. The quality measure can be configured (620) upon a chroma artifact criterion being met by the difference value. The quality measure, as aforementioned, is used in a compression quality evaluation system and can be indicative of perceptual quality of the compressed image.

According to certain embodiments, the difference value can be calculated based on the difference between pixel values of the input image and pixel values of the compressed image. It can be calculated in accordance with a difference estimation function, such as, for example, a Mean Square Error (MSE) function. The difference value in this case is thus a MSE value.

For example, assuming that A is an M pixel×N pixel input image with pixel values of A[i][j] with i=1, . . . , M, j=1, . . . N. And A' is the corresponding compressed image with pixel values of A'[i][j] with i=1, . . . , M, j=1, . . . N, the MSE value can be computed as follows:

$$MSE_{M \times N} = \frac{1}{N^2} \sum_{i=1}^{N} \sum_{j=1}^{N} (A[i][j] - A'[i][j])^2 \qquad \text{Formula 3}$$

It is to be noted that MSE is only illustrated as one possible way of calculating the difference value and should not be construed to limit the disclosure in any way, and other suitable functions for difference or variance estimation can be used instead or in lieu of the MSE.

As aforementioned with reference to FIG. 3, the input image and the compressed image can each comprise luma information represented in a luma plane and chroma information represented in one or more chroma planes. By way of example, in a YUV color model, the luma information can be represented in a Y plane, and the chroma information can be represented in a U plane and a V plane. Without limiting the disclosure in any way, other color models that can be used to encode the images includes: Y'UV, YUV, and YCbCr, etc.

According to certain embodiments, the difference value can be indicative of the extent of chroma compression artifacts present in the compressed image as compared to the input image, which can be evaluated based on the chroma information, and possibly also the luma information in the image pair. Specifically, in one embodiment, the calculation of the difference value (610) can include the following steps, as illustrated in FIG. 6B. The input image pair can be partitioned (601) into a plurality of tile groups according to a tile grid, each tile group comprising a luma tile pair in the luma plane, and one or more chroma tile pairs each in a chroma plane. The tile grid can be determined, e.g., based on a tile size as described above, so as to yield a predetermined number of tiles per image. Since the input image pair comprises an input image and a compressed image each including a luma plane and one or more chroma planes, after portioning, each plane in both images will be divided into multiple tiles respectively giving rise to a luma tile pair and one or more chroma tile pairs which together form a tile group. A luma tile pair includes a tile from the luma plane of the input image and a corresponding compressed tile from the luma plane of the compressed image. A chroma tile pair includes a tile from a chroma plane of the input image and a corresponding compressed tile from a chroma plane of the compressed image. By way of example, in the YUV color model as aforementioned, each tile group can include a Y tile pair in the Y plane, a U tile pair in the U plane, and a V tile pair in the V plane.

Following the portioning, for each tile group, a difference value can be calculated (602) for each tile pair in the tile group, giving rise to a luma tile difference value, and one or more chroma tile difference values. Continuing with the example of the YUV color model, a Y tile difference value, a U tile difference value and a V tile difference value can be calculated for each tile group.

Prior to the configuration of the quality measure in block 620, a determination can be made (603) as whether the chroma artifact criterion is met based on a first relationship among the luma tile difference value and the one or more chroma tile difference values of the tile group. Specifically, without limiting the disclosure in any way, the first relationship can include that, for example, at least one of the one or more chroma tile difference values is larger than the luma tile difference value, and the luma tile difference value exceeds a first threshold. The threshold is set such that variance caused by random noise in the compression process should not be considered and the chroma artifact criterion should only be met when there is appeared real chroma compression artifact.

Upon the determination being made that the chroma artifact criterion is met, the process goes to block 620 where the configuration of the quality measure takes place, as described in details below.

According to further embodiments, upon partitioning the image pair to tile groups, a sub-tile pooling process can be further performed in order to accurately represent presence of localized artifacts. By way of example, a tile can be divided by a 4*4 factor into 16 sub-tiles. By way of another example, a tile can also be divided by a 16*16 factor into 256 sub-tiles. In some cases a minimal sub-tile size can be set as 8 pixel×8 pixel. A tile quality score can be obtained by perceptually pooling the sub-tile quality scores, as described above with reference to FIG. 9. Thus the calculation of the difference value (610) can further include the following steps, as illustrated in FIG. 6C.

Each tile group can be partitioned (604) into a plurality of sub-tile groups according to a sub-tile grid, each sub-tile group comprising a luma sub-tile pair in the luma plane, and one or more chroma sub-tile pairs each in a chroma plane. By way of example, in the YUV color model as aforementioned, each sub-tile group can include a Y sub-tile pair in the Y plane, a U sub-tile pair in the U plane, and a V sub-tile pair in the V plane. It is to be noted that in some cases, the luma sub-tile pairs and the chroma sub-tile pairs in each sub-tile group can be in different sizes due to chroma subsampling by recording a picture's color information at reduced resolution. For example, in YUV 4:2:0 standard, the chroma sub-tiles are 2×2 times smaller than the luma sub-tiles.

For each sub-tile group in a tile group, a difference value can be calculated (605) for each sub-tile pair in the sub-tile group, giving rise to a plurality of luma sub-tile difference values, and a plurality of chroma sub-tile difference values. By way of example, in the YUV color model, a Y sub-tile difference value, a U sub-tile difference value and a V sub-tile difference value can be calculated for each sub-tile group.

Prior to the configuration of the quality measure in block 620, a determination can be made (606) as whether the chroma artifact criterion is met based on a second relationship among the plurality of luma and chroma sub-tile difference values of the tile group. Specifically, without limiting the disclosure in any way, the second relationship can include that, for example, a maximal value of the chroma sub-tile difference values of the tile group is larger than a maximal luma sub-tile difference value, and the maximal luma sub-tile difference value exceeds a second threshold. The second threshold is set in a similar manner as to the first threshold described above.

It is to be noted that the above described partition, calculation and determinations with reference to FIGS. 6B and 6C are illustrated for exemplified purposes only and should not be construed to limit the disclosure in any way. Other suitable ways of partitioning the input image pair and calculating the difference value in accordance, as well as determining the chroma artifact criterion being met based on certain conditions can be implemented in addition or in lieu of the above.

Having described various embodiments of the calculation of the difference value with reference to block 610 in FIG. 6A and the determination of whether the chroma artifact criterion is met, there are now described exemplified configurations of the quality measure upon the chroma artifact criterion being met with reference to block 620 of FIG. 6A.

According to certain embodiments, configuring the quality measure can include calculating a quality score in accordance with the quality measure based on chroma pixel values, e.g., in addition or in lieu of the luma pixel values. In one embodiment, the chroma pixel values used in the quality score calculation are from a chroma plane that has the maximal value of the chroma sub-tile difference values. By way of example, in a YUV color model, either the pixel values in the U plane or in the V plane can be used in the calculation of the quality score, according to which color plane produces the largest chroma sub-tile difference values. Without limiting the disclosure in any way, an exemplified quality measure that can be used for this configuration is the local similarity measure as described above.

According to certain embodiments, configuring the quality measure can include a stricter sub-tile pooling process. In one embodiment, each tile group can be partitioned into a plurality of sub-tile groups according to a finer sub-tile grid than the sub-tile grid as originally set. For instance, each tile can be partitioned into smaller and finer sub-tiles such that the highly localized artifacts in certain sub-tiles can be addressed. In another embodiment, perceptual weighting of sub-tile quality scores can be adapted. By way of example, different weight factors can be applied to different sub-tile quality scores when the pooling process is performed, e.g., based on the calculated sub-tile difference values. For instance, the perceptual weighting can be adapted to provide higher weight to sub-tile groups with a high sub-tile difference value. Without limiting the disclosure in any way, an exemplified quality measure that can be used for this configuration is the quality measure combining an inter-frame and intra-frame quality scores as aforementioned. The inter-frame quality score (i.e. the temporal component), and/or the intra-frame quality score can be calculated by using a stricter sub-tile pooling process as described above.

According to certain embodiments, configuring the quality measure can include adjusting a quality criterion of the quality measure upon the chroma artifact criterion being met. The determination of such criterion being met may be based on at least one of the following: the difference value calculated for the image pair, the tile difference values, and the sub-tile difference values, as described above. For instance, the target quality threshold used in the quality criterion can be set to a stricter level if the chroma artifact criterion is met by the difference value of the image pair or at least one tile group of the image pair.

According to certain embodiments, the quality measure can include a quality measure of added artifactual edges, and the configuration of the quality measure can include adjusting a quality criterion of the quality measure of added artifactual edges based on the difference value. For instance, the target quality threshold used in the quality criterion can be set to a stricter level if the chroma artifact criterion is met by the difference value of the image pair or at least one tile group of the image pair so as to reduce allowed added-artifactual edges in images or tiles with challenging chroma content. Additionally thresholds used within calculation of the artifactual edges may be adapted for the image, or optionally only for tiles where the chroma artifact criteria are met.

According to certain embodiments, configuring the quality measure can include adapting perceptual weighting of tile quality scores. By way of example, the perceptual weighting can be increased for a tile group of which the chroma artifact criterion is met.

It is to be noted that the above described different configuration schemes are illustrated for exemplified purposed only and should not be construed to limit the disclosure in any way. Other suitable ways to configure a quality measure based on the difference value and/or the chroma artifact criterion being met can be applied in addition or in lieu of the above.

Figure 10A:
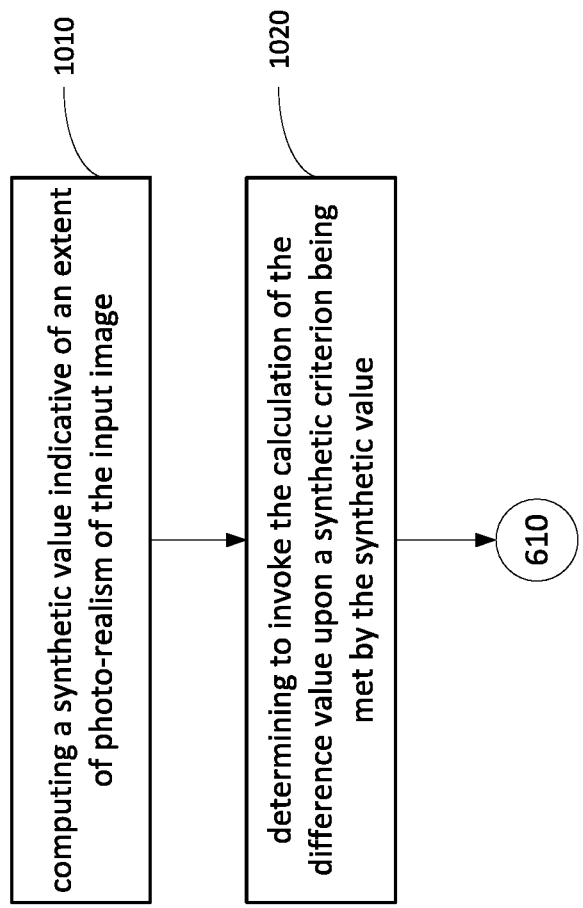
FIG. 10A is a generalized flowchart of computing a synthetic value of the input image prior to adapting a chroma artifact measure in accordance with certain embodiments of the presently disclosed subject matter.

As described above with reference to FIG. 3, in order to apply the chroma artifact measure only to synthetic images or videos and refrain from affecting the quality measure of photo-realistic images or videos, there is a need to identify such synthetic images prior to adapting the chroma artifact measure in accordance with certain embodiments, as illustrated in FIG. 10A. Prior to the calculation of the difference value (610), a synthetic value can be computed (1010) (e.g., by the synthetic calculator 316 in FIG. 3) indicative of an extent of photo-realism of the input image. By way of example and without limiting the disclosure in any way, a synthetic value can be computed based on a distribution of pixel luminance values within the input image. An exemplified illustration of such computation is described in PCT patent application WO2013/144942 published on Oct. 3, 2013, which is incorporated herein in its entirety by reference, in particular, see paragraphs [070]-[0100]. A determination can be made (1020) to invoke the calculation of the difference value (610) upon a synthetic criterion being met by the synthetic value.

Figure 10B:
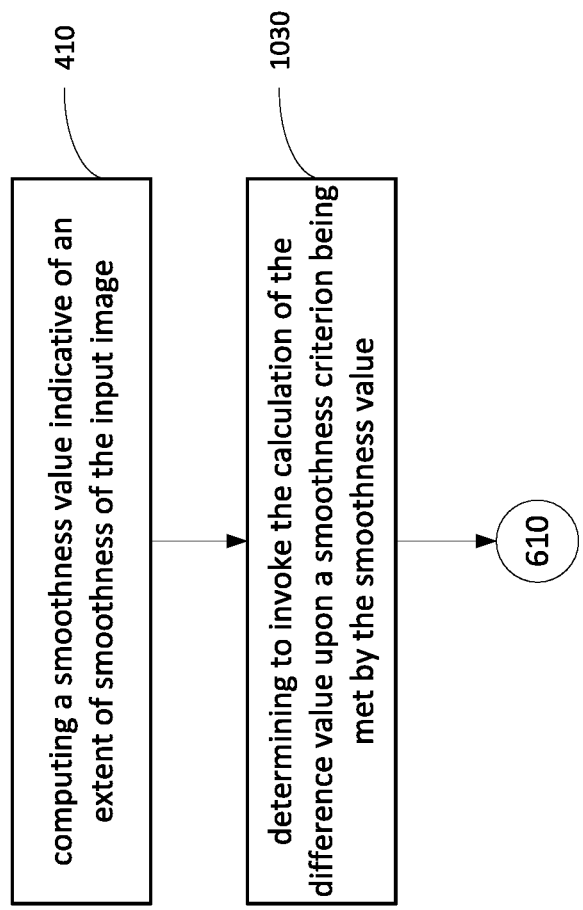
FIG. 10B is a generalized flowchart of computing a smoothness value of the input image prior to adapting a chroma artifact measure in accordance with certain embodiments of the presently disclosed subject matter.

According to further embodiments, prior to the calculation of the difference value (610), as illustrated in FIG. 10B, a smoothness value can be computed (e.g., by the smoothness calculator 106 in FIG. 3) indicative of an extent of smoothness of the input image, as described with reference to block 410 in FIG. 4A. A determination can be made (1030) to invoke the calculation of the difference value (610) upon a smoothness criterion being met by the smoothness value, as described with reference to block 420 in FIG. 4B.

Figure 10C:
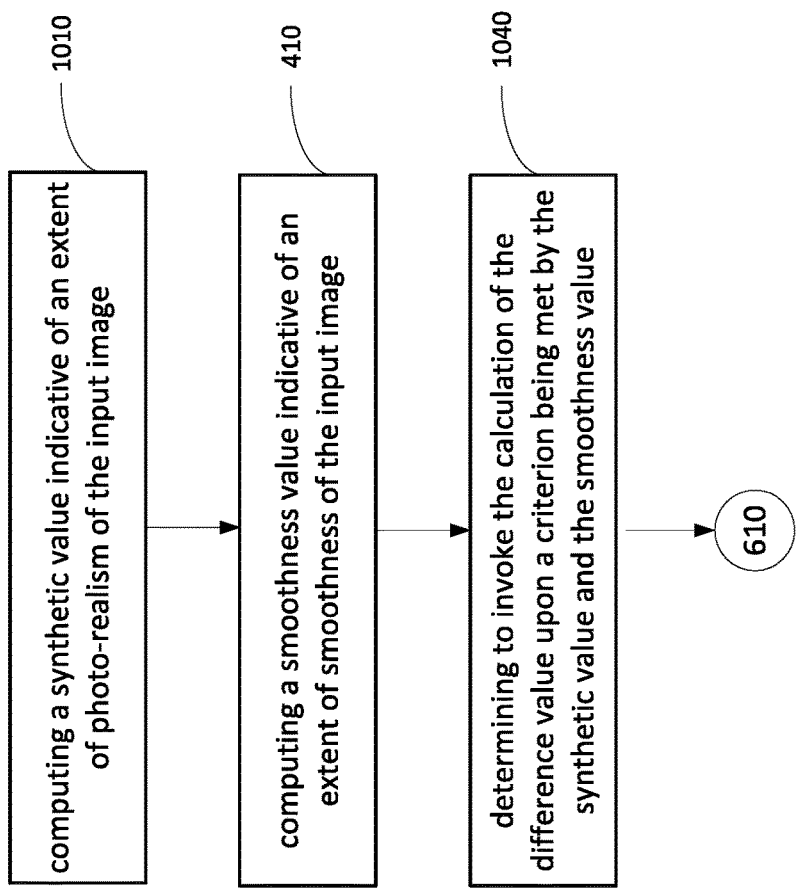
FIG. 10C is a generalized flowchart of computing both a synthetic value and a smoothness value of the input image prior to adapting a chroma artifact measure in accordance with certain embodiments of the presently disclosed subject matter.

According to yet further embodiments, prior to the calculation of the difference value (610), both the synthetic value and the smoothness value can be calculated, and a determination is made (1040) to invoke the calculation of the difference value upon a combined criterion being met by both the synthetic value and the smoothness value, as illustrated in FIG. 10C.

Figure 10D:
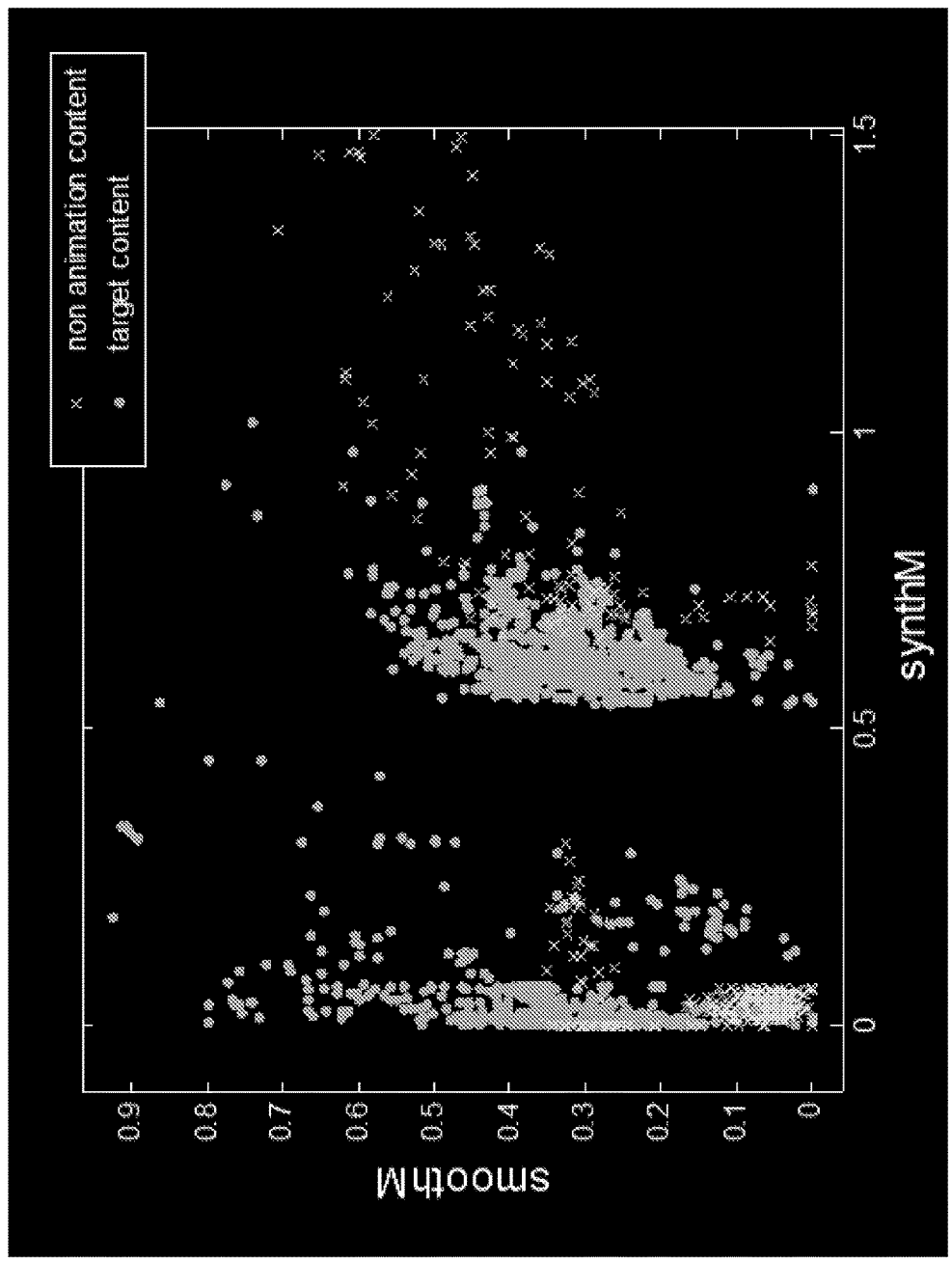
FIG. 10D is an exemplified distribution of the synthetic value and the smoothness value calculated in the image level for a plurality of input images in accordance with certain embodiments of the presently disclosed subject matter.

Turning now to FIG. 10D, there is shown an exemplified distribution of the synthetic value (shown as "synthM" on the X axis) and smoothness value (shown as "smoothM" on the Y axis) calculated in the image level for a plurality of input images. As illustrated, there are clusters or regions corresponding to the target content which is the synthetic or less phone-realistic content (marked by dots), while other clusters or regions corresponding to non-animation or photo-realistic content (marked by crosses), thus allowing for classification of the input images. For example, the following rules can be used as a combined criterion to be met by the synthetic value and smoothness value of an input image such that the chroma measure may be applied:

$0.5 < synthM < 0.8$ and $0.1 < smoothM < 0.6$ or $synthM < 0.1$ and $0.35 < smoothM < 0.75$.

In the cases that the input image comprises a plurality of tiles, calculating the smoothness value at the tile level can provide additional valuable information for the classification of the input images. For example, for most synthetic content (e.g., high quality sophisticated animation content), 30% or more of the tiles that meet the chroma artifact criterion have a smoothness value larger than zero, while in photo-realistic content, only 4-5% of the tiles that meet the chroma artifact criterion have a smoothness value larger than 0.

Accordingly the computation of a smoothness value can further comprise the following steps: computing an image smoothness value indicative of an extent of smoothness of the input image, and computing a plurality of tile smoothness values each for a tile indicative of an extent of smoothness of the tile. The determination is then made to invoke the calculation of the difference value upon a combined criterion being met by the synthetic value, the image smoothness value and the tile smoothness value. By way of example, the combined criterion can include: at least one tile that meets the chroma artifact criterion in the input image has a tile smoothness value which is larger than 0 and the synthetic value (for the input image) and image smoothness value fall within below range:

synth$M$<0.1 & 0.1<smooth$M$<0.35

It is to be noted that the above described distributions and criterions with reference to FIG. 10D which are based on experiment results are illustrated for exemplified purposed only and should not be construed to limit the disclosure in any way. Other suitable criterions as to determine whether to apply the chroma measure can be applied in addition or in lieu of the above.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based can readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A computerized method of controlling a quality measure in a compression quality evaluation system, the method comprising:
   calculating a smoothness value indicative of an extent of smoothness of an input image, wherein said calculating is based on at least a portion of the input image and comprises excluding an area of the at least a portion of the input image from the calculation of the smoothness value upon a condition being met; and wherein the at least a portion comprises a plurality of superblocks each including one or more variance blocks, and said calculating includes:
   i) computing one or more variance values each for a respective variance block in a superblock, each variance value representing a statistical variance of pixel values in the respective variance block;
   ii) computing a local smoothness value for the superblock based on the one or more variance values;
   iii) repeating said i) and ii) for each superblock, giving rise to a plurality of local smoothness values each for a respective superblock; and
   iv) pooling the plurality of local smoothness values to obtain the smoothness value for the input image; and configuring the quality measure upon a smoothness criterion being met by said smoothness value, the quality measure being indicative of perceptual quality of a compressed image compressed from the input image.

2. The computerized method of claim 1, wherein said condition is that no pixel value of the area exceeds a darkness threshold.

3. The computerized method of claim 1, wherein said pooling is based on at least one of the following: an average value of the plurality of local smoothness values, a maximal local smoothness value, and a minimal local smoothness value.

4. The computerized method of claim 1, wherein said configuring comprises configuring a local similarity measure that quantifies local similarities between the input image and the compressed image.

5. The computerized method of claim 4, wherein said configuring a local similarity measure includes:
   detecting edges in the at least a portion of the input image; and
   computing a local similarity score in accordance with the local similarity measure for a group of pixels in proximity of and on the edges.

6. A computerized method of controlling a quality measure in a compression quality evaluation system, the method comprising:
   calculating a gradient value indicative of an extent of gradual spatial changes of an input image, wherein said calculating is based on at least a portion of the input image comprising a plurality of coding blocks, and wherein said calculating includes:
   i) calculating a block range value for each coding block indicating a range of pixel values in the coding block;
   ii) computing a plurality of local gradient values each for a coding block upon a plurality of conditions being met; and
   iii) computing the gradient value for the at least a portion of the input image based on the plurality of local gradient values; and
   configuring the quality measure upon a gradient criterion being met by said gradient value, the quality measure being indicative of perceptual quality of a compressed image compressed from the input image.

7. The computerized method of claim 6, wherein the plurality of conditions includes:
   a) the block range value of the coding block is below a first threshold;
   b) the block range value of at least one adjacent coding block of the coding block is below the first threshold; and
   c) at least one block pair range value indicating a range of pixel values in a block pair meets a range criterion, the block pair including the coding block and one of the at least one adjacent coding block of which the block range value is below the first threshold.

8. The computerized method of claim 7, wherein the computing a local gradient score is based on the block range value of the coding block and the at least one block pair range value.

9. The computerized method of claim 7, wherein the range criterion is that the block pair range value is larger than the block range value and smaller than a second threshold.

10. The computerized method of claim 6, wherein said computing the gradient value is based on at least one of the following: an average of the plurality of local gradient values, a maximal local gradient value, and a minimal local gradient value.

11. The computerized method of claim 6, wherein the input image comprises a plurality of portions each comprising one tile, the method comprising:

calculating a plurality of tile gradient values each for a tile, each tile gradient value indicative of an extent of gradual spatial changes of the tile; and configuring the quality measure upon a gradient criterion being met by at least one tile gradient value of the plurality of tile gradient values.

12. The computerized method of claim 11, wherein the configuring includes adjusting a quality criterion of the quality measure based on the at least one tile gradient value.

13. The computerized method of claim 11, wherein the quality measure includes a quality measure of added artifactual edges, and said configuring includes adjusting a quality criterion of the quality measure of added artifactual edges based on the at least one tile gradient value.

14. The computerized method of claim 6, wherein the configuring includes adjusting a quality criterion of the quality measure based on the gradient value.

15. The computerized method of claim 6, wherein the quality measure includes a quality measure of added artifactual edges, and said configuring includes adjusting a quality criterion of the quality measure of added artifactual edges based on the gradient value.

16. The computerized method of claim 6, wherein the quality measure is a local similarity measure quantifying local similarities between the input image and the compressed image.

17. A computerized method of controlling a quality measure in a compression quality evaluation system based on an input image pair including an input image and a corresponding compressed image compressed from the input image, the method comprising:

calculating a difference value indicative of an extent of difference between the compressed image and the input image, wherein the difference value is calculated based on difference between pixel values of the input image and pixel values of the compressed image; and configuring the quality measure upon a chroma artifact criterion being met by said difference value, the quality measure being indicative of perceptual quality of the compressed image.

18. The computerized method of claim 17, wherein the input image and the compressed image each comprises luma information represented in a luma plane and chroma information represented in one or more chroma planes, the method further comprising:

partitioning the input image pair into a plurality of tile groups according to a tile grid, each tile group comprising a luma tile pair in the luma plane, and one or more chroma tile pairs each in a chroma plane; and for each tile group, calculating a difference value for each tile pair in the tile group, giving rise to a luma tile difference value, and one or more chroma tile difference values;

determining the chroma artifact criterion being met by the tile group based on a first relationship among the luma tile difference value and the one or more chroma tile difference values of the tile group.

19. The computerized method of claim 18, wherein said first relationship is that at least one of the one or more chroma tile difference values is larger than the luma tile difference value, and the luma tile difference value exceeds a first threshold.

20. The computerized method of claim 18, wherein the method further comprises:

partitioning each tile group into a plurality of sub-tile groups according to a sub-tile grid, each sub-tile group comprising a luma sub-tile pair in the luma plane, and one or more chroma sub-tile pairs each in a chroma plane;

for each sub-tile group in a tile group, calculating a difference value for each sub-tile pair in the sub-tile group, giving rise to a plurality of luma sub-tile difference values, and a plurality of chroma sub-tile difference values; and determining the chroma artifact criterion being met by the tile group based on a second relationship among the plurality of luma and chroma sub-tile difference values of the tile group.

21. The computerized method of claim 20, wherein said second relationship is that a maximal value of the chroma sub-tile difference values of the tile group is larger than a maximal luma sub-tile difference value, and the maximal luma sub-tile difference value exceeds a second threshold.

22. The computerized method of claim 21, wherein the configuring comprises computing a quality score in accordance with the quality measure based on chroma pixel values in a chroma plane that has the maximal value of the chroma sub-tile difference values.

23. The computerized method of claim 20, wherein the configuring comprises partitioning each tile group into a plurality of sub-tile groups according to a finer sub-tile grid than said sub-tile grid.

24. The computerized method of claim 20, wherein the configuring comprises adapting perceptual weighting of sub-tile quality scores.

25. The computerized method of claim 18, wherein the configuring comprises adapting perceptual weighting of tile quality scores.

26. The computerized method of claim 25, wherein the adapting comprises increasing the perceptual weighting for a tile group of which the chroma artifact criterion is met.

27. The computerized method of claim 17, wherein the difference value is a Mean Square Error (MSE) value.

28. The computerized method of claim 17, wherein the configuring comprises computing a quality score in accordance with the quality measure based on chroma pixel values.

29. The computerized method of claim 17, wherein the configuring includes adjusting a quality criterion of the quality measure.

30. The computerized method of claim 17, wherein the quality measure includes a quality measure of added artifactual edges, and said configuring includes adjusting a quality criterion of the quality measure of added artifactual edges.

31. The computerized method of claim 17, the method further comprising:

prior to said calculating, computing a synthetic value indicative of an extent of photo-realism of the input image, and determining to invoke the calculation of the difference value upon a synthetic criterion being met by said synthetic value.

32. The computerized method of claim 31, wherein said computing a synthetic value is based on a distribution of pixel luminance values within the input image.

33. The computerized method of claim 17, the method further comprising:

prior to said calculating, computing a smoothness value indicative of an extent of smoothness of the input image, and determining to invoke the calculation of the difference value upon a smoothness criterion being met by said smoothness value.

34. The computerized method of claim 17, the method further comprising:
prior to said calculating,
computing a synthetic value indicative of an extent of photo-realism of the input image,
computing a smoothness value indicative of an extent of smoothness of the input image, and
determining to invoke the calculation of the difference value upon a combined criterion being met by said synthetic value and said smoothness value.

35. The computerized method of claim 33, wherein said input image comprises a plurality of tiles, and wherein said computing a smoothness value comprises:
computing an image smoothness value indicative of an extent of smoothness of the input image, and
computing a plurality of tile smoothness values each for a tile indicative of an extent of smoothness of the tile, and
wherein said determining comprises determining to invoke the calculation of the difference value upon a combined criterion being met by said synthetic value, said image smoothness value and said tile smoothness value.

36. A computerized system of controlling a quality measure in a compression quality evaluation system, the system comprising a processor configured to:
calculate a smoothness value indicative of an extent of smoothness of an input image, wherein said calculating is based on at least a portion of the input image and comprises excluding an area of the at least a portion of the input image from the calculation of the smoothness value upon a condition being met, and wherein the at least a portion comprises a plurality of superblocks each including one or more variance blocks, and said calculating includes:
i) computing one or more variance values each for a respective variance block in a superblock, each variance value representing a statistical variance of pixel values in the respective variance block;
ii) computing a local smoothness value for the superblock based on the one or more variance values;
iii) repeating said i) and ii) for each superblock, giving rise to a plurality of local smoothness values each for a respective superblock; and
iv) pooling the plurality of local smoothness values to obtain the smoothness value for the input image; and
configure the quality measure upon a smoothness criterion being met by said smoothness value, the quality measure being indicative of perceptual quality of a compressed image compressed from the input image.

37. A computerized system of controlling a quality measure in a compression quality evaluation system, the system comprising a processor configured to:
calculate a gradient value indicative of an extent of gradual spatial changes of an input image, wherein said calculating is based on at least a portion of the input image comprising a plurality of coding blocks, and wherein said calculating includes:
i) calculating a block range value for each coding block indicating a range of pixel values in the coding block;
ii) computing a plurality of local gradient values each for a coding block upon a plurality of conditions being met; and iii) computing the gradient value for the at least a portion of the input image based on the plurality of local gradient values; and
configure the quality measure upon a gradient criterion being met by said gradient value, the quality measure being indicative of perceptual quality of a compressed image compressed from the input image.

38. A computerized system of controlling a quality measure in a compression quality evaluation system based on an input image pair including an input image and a corresponding compressed image compressed from the input image, the system comprising a processor configured to:
calculate a difference value indicative of an extent of difference between the compressed image and the input image, wherein the difference value is calculated based on difference between pixel values of the input image and pixel values of the compressed image; and
configure the quality measure upon a chroma artifact criterion being met by said difference value, the quality measure being indicative of perceptual quality of the compressed image.

39. A non-transitory computer readable storage medium tangibly embodying a program of instructions executable by a machine to control a quality measure in a compression quality evaluation system, comprising the steps of the following:
calculating a smoothness value indicative of an extent of smoothness of an input image, wherein said calculating is based on at least a portion of the input image and comprises excluding an area of the at least a portion of the input image from the calculation of the smoothness value upon a condition being met, and wherein the at least a portion comprises a plurality of superblocks each including one or more variance blocks, and said calculating includes:
i) computing one or more variance values each for a respective variance block in a superblock, each variance value representing a statistical variance of pixel values in the respective variance block;
ii) computing a local smoothness value for the superblock based on the one or more variance values;
iii) repeating said i) and ii) for each superblock, giving rise to a plurality of local smoothness values each for a respective superblock; and
iv) pooling the plurality of local smoothness values to obtain the smoothness value for the input image; and
configuring the quality measure upon a smoothness criterion being met by said smoothness value, the quality measure being indicative of perceptual quality of a compressed image compressed from the input image.

40. A non-transitory computer readable storage medium tangibly embodying a program of instructions executable by a machine to control a quality measure in a compression quality evaluation system, comprising the steps of the following:
calculating a gradient value indicative of an extent of gradual spatial changes of an input image, wherein said calculating is based on at least a portion of the input image comprising a plurality of coding blocks, and wherein said calculating includes:
i) calculating a block range value for each coding block indicating a range of pixel values in the coding block;
ii) computing a plurality of local gradient values each for a coding block upon a plurality of conditions being met; and iii) computing the gradient value for the at least a portion of the input image based on the plurality of local gradient values; and configuring the quality measure upon a gradient criterion being met by said gradient value, the quality measure being indicative of perceptual quality of a compressed image compressed from the input image.

41. A non-transitory computer readable storage medium tangibly embodying a program of instructions executable by a machine to control a quality measure in a compression quality evaluation system based on an input image pair including an input image and a corresponding compressed image compressed from the input image, comprising the steps of the following:

calculating a difference value indicative of an extent of difference between the compressed image and the input image, wherein the difference value is calculated based on difference between pixel values of the input image and pixel values of the compressed image; and configuring the quality measure upon a chroma artifact criterion being met by said difference value, the quality measure being indicative of perceptual quality of the compressed image.

* * * * *